US012286983B2

(12) United States Patent
Wijesundara et al.

(10) Patent No.: US 12,286,983 B2
(45) Date of Patent: Apr. 29, 2025

(54) CORRUGATED DIAPHRAGM ACTUATOR

(71) Applicant: BOARD OF REGENTS, THE UNIVERSITY OF TEXAS SYSTEM, Austin, TX (US)

(72) Inventors: Muthu Wijesundara, Fort Worth, TX (US); Veysel Erel, Fort Worth, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 274 days.

(21) Appl. No.: 17/700,385

(22) Filed: Mar. 21, 2022

(65) Prior Publication Data
US 2022/0299130 A1 Sep. 22, 2022

Related U.S. Application Data

(60) Provisional application No. 63/163,620, filed on Mar. 19, 2021.

(51) Int. Cl.
| F15B 15/10 | (2006.01) |
| B25J 9/00 | (2006.01) |
| B25J 9/14 | (2006.01) |
| B25J 15/12 | (2006.01) |
| F16J 3/02 | (2006.01) |
| F16K 31/126 | (2006.01) |

(52) U.S. Cl.
CPC .............. F15B 15/10 (2013.01); B25J 9/0006 (2013.01); B25J 9/142 (2013.01); B25J 15/12 (2013.01); F16J 3/02 (2013.01); F16K 31/126 (2013.01)

(58) Field of Classification Search
CPC .. F15B 15/10; B25J 9/006; B25J 9/142; B25J 15/12; F16J 3/02; F16K 31/126
See application file for complete search history.

(56) References Cited

U.S. PATENT DOCUMENTS

| 3,343,864 | A | * | 9/1967 | Baer | ................. | B25J 15/12 |
| | | | | | | 92/92 |
| 3,565,398 | A | * | 2/1971 | Floria | .................. | B66F 3/35 |
| | | | | | | 254/93 HP |
| 4,467,656 | A | * | 8/1984 | Mallon | ............... | G01L 9/0042 |
| | | | | | | 338/42 |
| 4,687,189 | A | * | 8/1987 | Stoll | ..................... | B25B 5/065 |
| | | | | | | 269/22 |

(Continued)

OTHER PUBLICATIONS

Panizzolo, F.A., Galiana, I., Asbeck, A.T., Siviy, C., Schmidt, K., Holt, K.G. and Walsh, C.J., 2016. A biologically-inspired multi-joint soft exosuit that can reduce the energy cost of loaded walking. Journal of neuroengineering and rehabilitation, 13(1), pp. 1-14.

(Continued)

*Primary Examiner* — Dustin T Nguyen
(74) *Attorney, Agent, or Firm* — Meunier Carlin & Curfman LLC

(57) ABSTRACT

A corrugated diaphragm actuator may include a chamber body including a plurality of walls defining a cavity. The plurality of walls may include a first wall including a first corrugated diaphragm defining at least one first corrugated channel, and the corrugated diaphragm may be configured for expanding outwardly when a positive pressure is applied within the cavity.

13 Claims, 37 Drawing Sheets

(56) References Cited

U.S. PATENT DOCUMENTS

| | | | | |
|---|---|---|---|---|
| 4,813,657 | A * | 3/1989 | Todd | B25B 5/065 |
| | | | | 269/22 |
| 5,064,165 | A * | 11/1991 | Jerman | G01L 9/0073 |
| | | | | 92/104 |
| 5,251,538 | A * | 10/1993 | Smith | F01B 19/00 |
| | | | | 92/92 |
| 6,484,601 | B1 * | 11/2002 | Arrichiello | B25J 9/14 |
| | | | | 92/37 |
| 6,612,223 | B2 * | 9/2003 | Leonard | B66F 3/35 |
| | | | | 92/96 |
| 6,718,766 | B2 * | 4/2004 | Seto | F15B 15/18 |
| | | | | 92/48 |
| 6,907,817 | B2 * | 6/2005 | Parks | F15B 15/10 |
| | | | | 92/35 |
| 9,464,642 | B2 | 10/2016 | Ilievski et al. | |
| 9,482,244 | B2 * | 11/2016 | Leonard | F15B 15/103 |
| 10,173,328 | B2 | 1/2019 | Lessing et al. | |
| 10,189,168 | B2 | 1/2019 | Lessing et al. | |
| 10,190,606 | B2 * | 1/2019 | Leonard | F15B 15/10 |
| 10,894,325 | B2 * | 1/2021 | Bao | B25J 15/0009 |
| 2016/0114482 | A1 | 4/2016 | Lessing et al. | |

OTHER PUBLICATIONS

Awad, L.N., Bae, J., O'donnell, K., De Rossi, S.M., Hendron, K., Sloot, L.H., Kudzia, P., Allen, S., Holt, K.G., Ellis, T.D. and Walsh, C.J., 2017. A soft robotic exosuit improves walking in patients after stroke. Science translational medicine, 9(400).

Irshaidat, M., Soufian, M., Elkurdi, A. and Nefti-Meziani, S., 2019, October. Soft and Hard Robotics for Movement Rehabilitation, Analysis and Modelling. In 2019 12th International Conference on Developments in eSystems Engineering (DeSE) (pp. 964-969). IEEE.

Haghshenas-Jaryani, M., Patterson, R.M., Bugnariu, N. and Wijesundara, M.B., 2020. A pilot study on the design and validation of a hybrid exoskeleton robotic device for hand rehabilitation. Journal of Hand Therapy, 33(2), pp. 198-208.

Walker, J., Zidek, T., Harbel, C., Yoon, S., Strickland, F.S., Kumar, S. and Shin, M., 2020, March. Soft robotics: a review of recent developments of pneumatic soft actuators. In Actuators (vol. 9, No. 1, p. 3). Multidisciplinary Digital Publishing Institute.

Gorissen, B., Chishiro, T., Shimomura, S., Reynaerts, D., De Volder, M. and Konishi, S., 2014. Flexible pneumatic twisting actuators and their application to tilting micromirrors. Sensors and Actuators A: Physical, 216, pp. 426-431.

Sridar, S., Nguyen, P.H., Zhu, M., Lam, Q.P. and Polygerinos, P., 2017, September. Development of a soft-inflatable exosuit for knee rehabilitation. In 2017 IEEE/RSJ International Conference on Intelligent Robots and Systems (IROS) (pp. 3722-3727). IEEE.

Onal, C.D. and Rus, D., 2012, June. A modular approach to soft robots. In 2012 4th IEEE RAS & EMBS International Conference on Biomedical Robotics and Biomechatronics (BioRob) (pp. 1038-1045). IEEE.

Haghshenas-Jaryani, Mahdi, Wei Carrigan, and Muthu BJ Wijesundara. "Design and development of a novel soft-and-rigid hybrid actuator system for robotic applications." In International Design Engineering Technical Conferences and Computers and Information in Engineering Conference, vol. 57120, p. V05AT08A047. American Society of Mechanical Engineers, 2015.

Lindsay, Alexandra R., Usamah Chaudhary, Taylor N, Terry, Mahdi Haghshenas-Jaryani,, and Muthu B. J. Wijesundara "Interconnected Fluid-Filled Cells Design for Reduction of Linear Acceleration and Force Transfer to Prevent Concussion." Proceedings of the ASME 2019 IMECE. Salt Lake City, Utah. vol. 3. V003T04A051. https://doi.org/10.1115/IMECE2019-10675.

Erel, Veysel, Inderjeet Singh, Alexandra R. Lindsay, Wenyuan Shi, and Muthu B. J. Wijesundara. "Development and Characterization Modular Soft Actuator Enabled Elbow Exoskeleton for Assistive Movements." ASME IDETC/CIE, 2021.

Nassour, J., Hamker, F.H. and Cheng, G., 2020. High-Performance Perpendicularly-Enfolded-Textile Actuators for Soft Wearable Robots: Design and Realization. IEEE Transactions on Medical Robotics and Bionics, 2(3), pp. 309-319.

Malagelada, F., Dalmau-Pastor, M., Vega, J. and Golano, P., 2014. Elbow anatomy. Sports injuries: prevention, diagnosis, treatment and rehabilitation, 2, pp. 527-553.

Walpole, S.C., Prieto-Merino, D., Edwards, P., Cleland, J., Stevens, G. and Roberts, I., 2012. The weight of nations: an estimation of adult human biomass. BMC public health, 12(1), pp. 1-6.

Clauser, C.E., McConville, J.T. and Young, J.W., 1969. Weight, volume, and center of mass of segments of the human body. Antioch Coll Yellow Springs.

El-Atab, Nazek, Rishabh B. Mishra, Fhad Al-Modaf, Lana Joharji, Aljohara A. Alsharif, Haneen Alamoudi, Marlon Diaz, Nadeem Qaiser, and Muhammad Mustafa Hussain. "Soft Actuators for Soft Robotic Applications: A Review." Advanced Intelligent Systems 2, No. 10 (2020): 2000128.

Veale, Allan Joshua, and Shane Quan Xie. "Towards compliant and wearable robotic orthoses: A review of current and emerging actuator technologies." Medical engineering & physics 38, No. 4 (2016): 317-325.

https://www.softroboticsinc.com/products.

https://www.roceso.com/esoglove-pro.

Boyraz, Pinar, Gundula Runge, and Annika Raatz. "An overview of novel actuators for soft robotics." In Actuators, vol. 7, No. 3, p. 48. Multidisciplinary Digital Publishing Institute, 2018.

Wakimoto, Shuichi, Koichi Suzumori, and Jungo Takeda. "Flexible artificial muscle by bundle of McKibben fiber actuators." In 2011 IEEE/ASME International Conference on Advanced Intelligent Mechatronics (AIM), pp. 457-462. IEEE, 2011.

Whitesides, George M. "Soft robotics." Angewandte Chemie International Edition 57, No. 16 (2018): 4258-4273.

Haghshenas-Jaryani, Mahdi, Wei Carrigan, and Muthu BJ Wijesundara. "Design and development of a novel soft-and-rigid hybrid actuator system for robotic applications." ASME IDETC/CIE, vol. 57120, p. V05AT08A047. 2015.

* cited by examiner

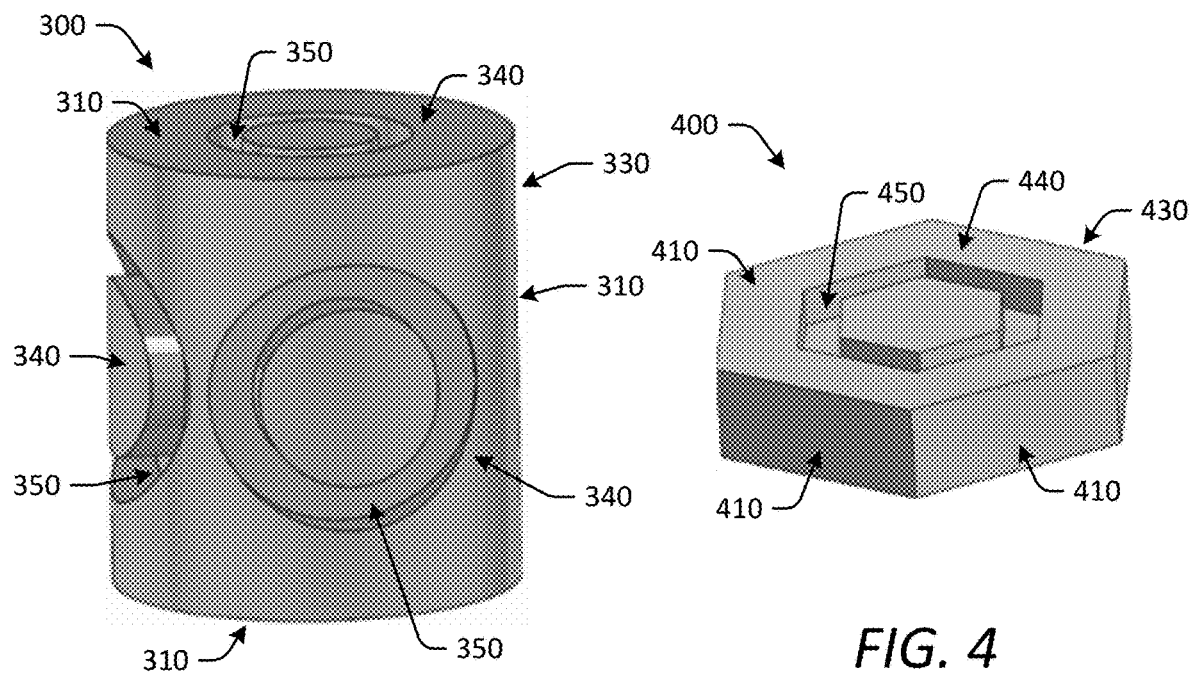
FIG. 3
FIG. 4
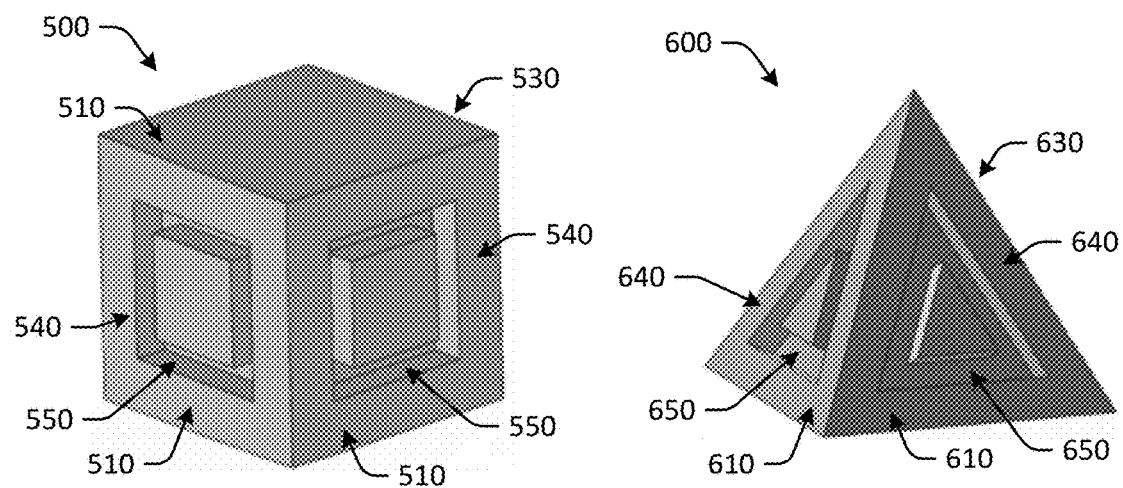
FIG. 5
FIG. 6

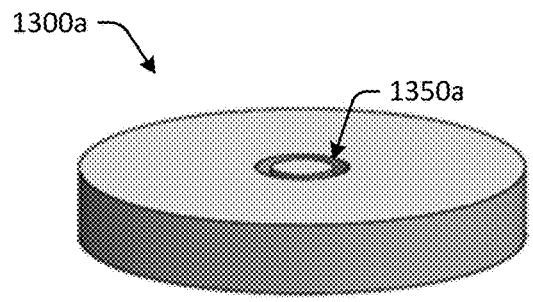
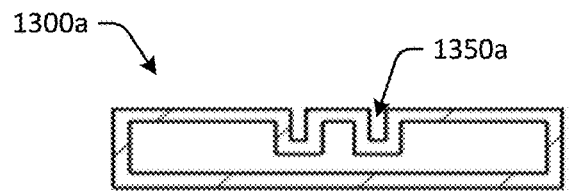
FIG. 13A                    FIG. 13B
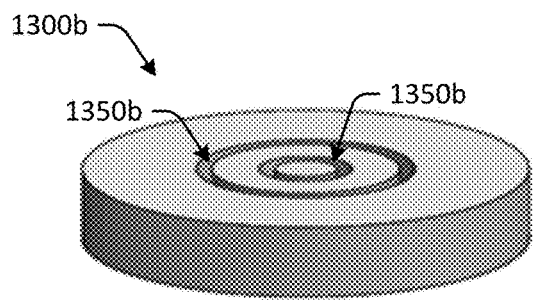
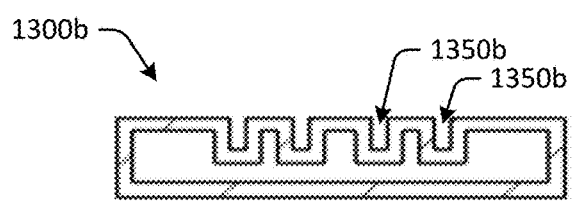
FIG. 13C                    FIG. 13D
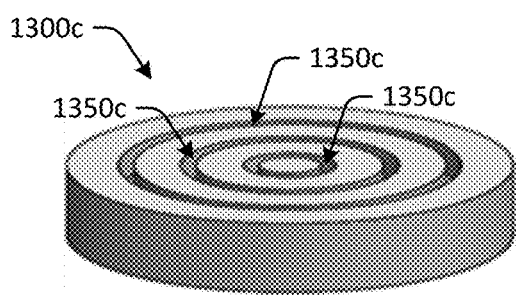
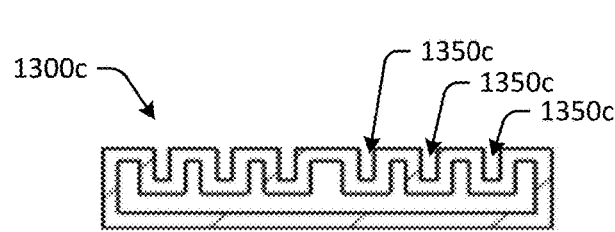
FIG. 13E                    FIG. 13F

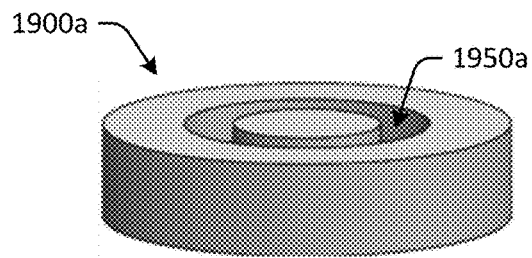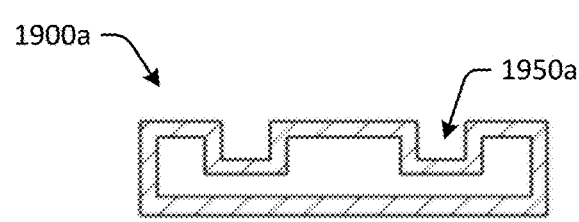
FIG. 19A    FIG. 19B
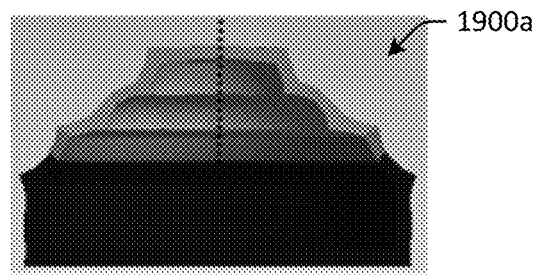
FIG. 19C
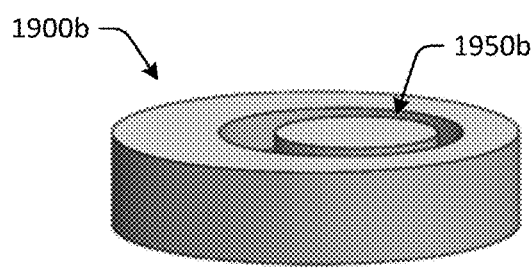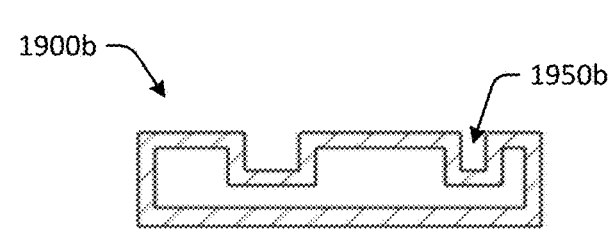
FIG. 19D    FIG. 19E
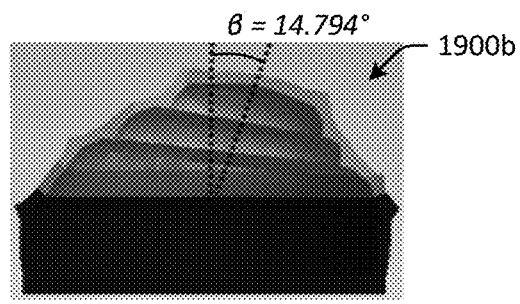
FIG. 19F

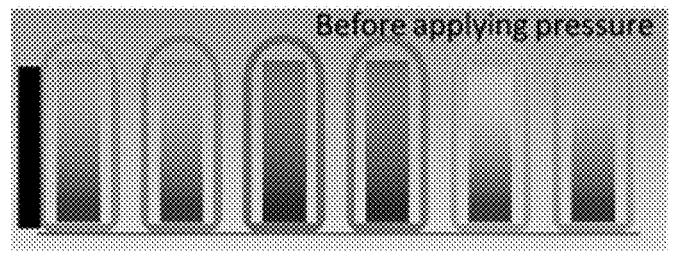
FIG. 24A
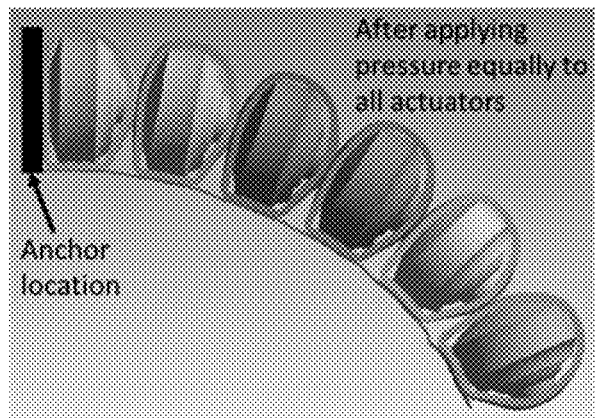
FIG. 24B
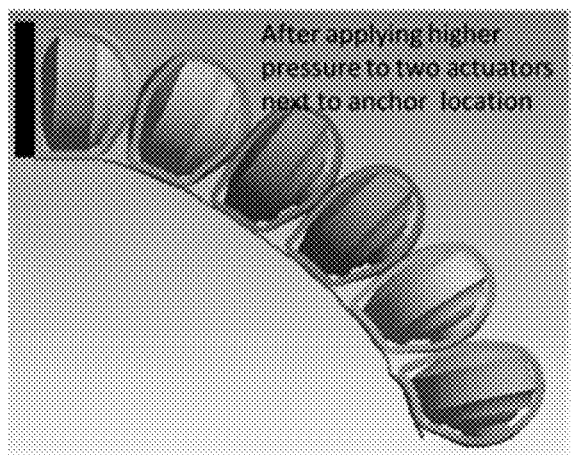 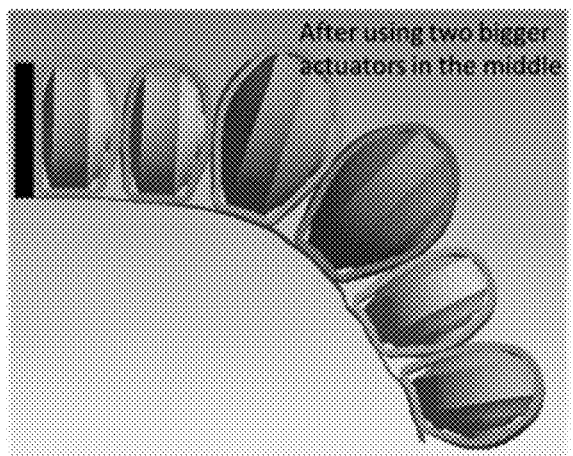
FIG. 24C          FIG. 24D

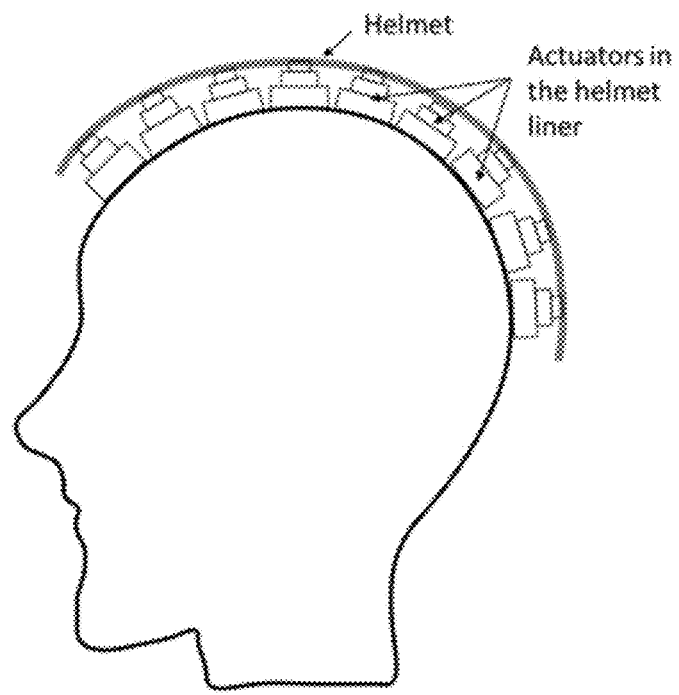
FIG. 31A
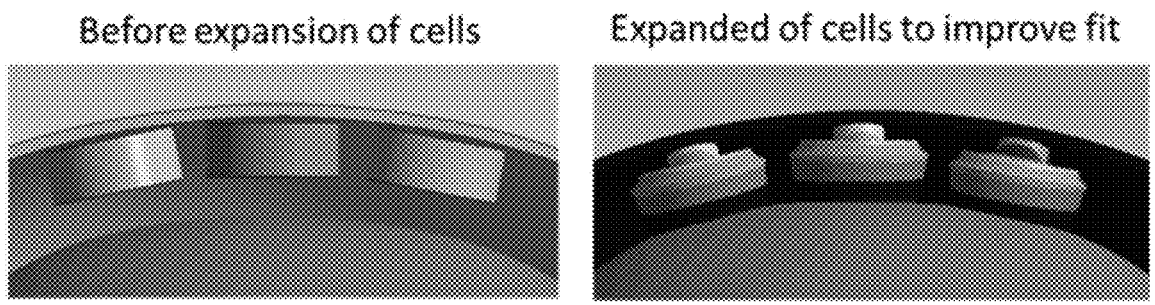
FIG. 31B
FIG. 31C
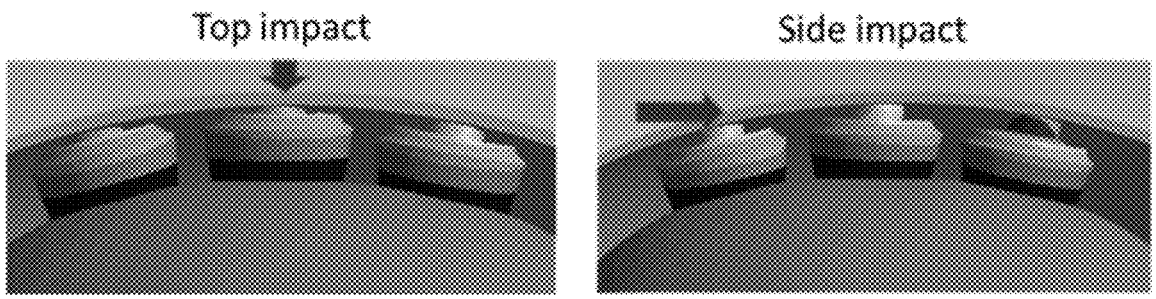
FIG. 31D
FIG. 31E

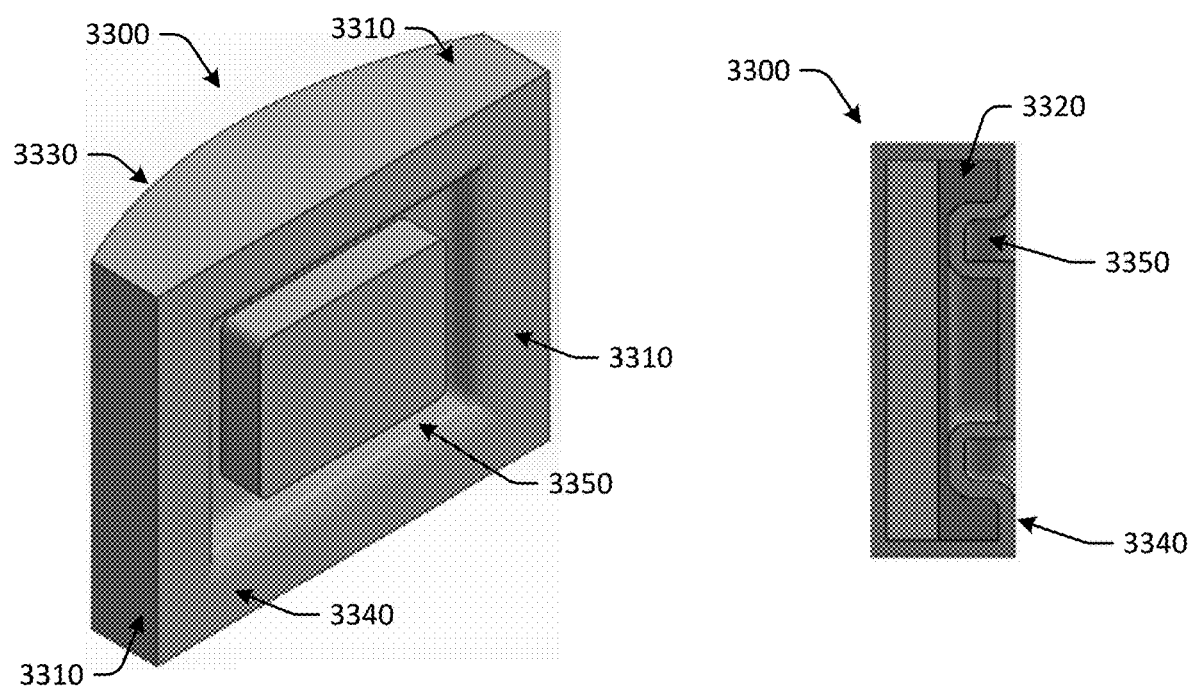
FIG. 33A
FIG. 33B
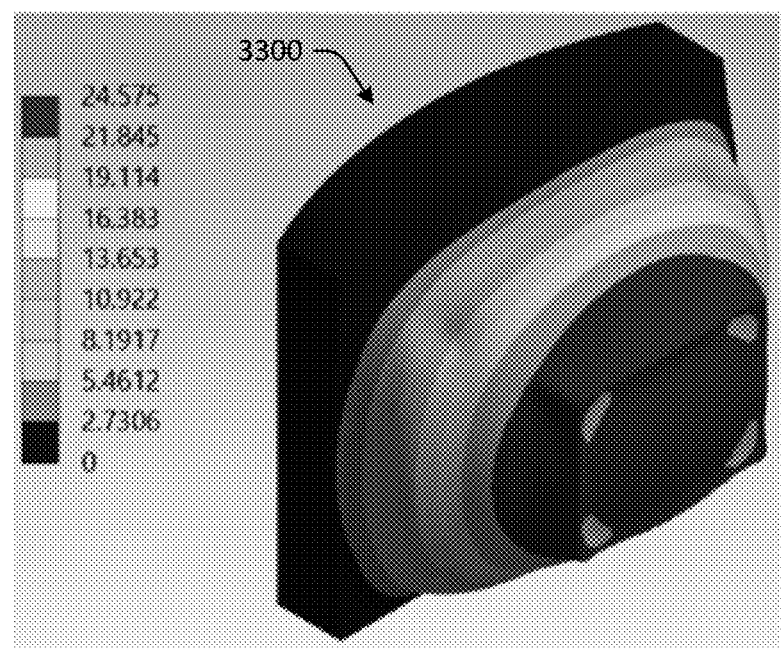
FIG. 33C

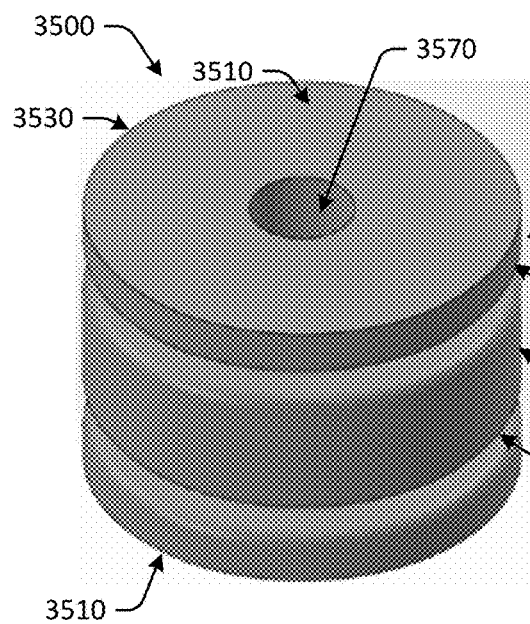
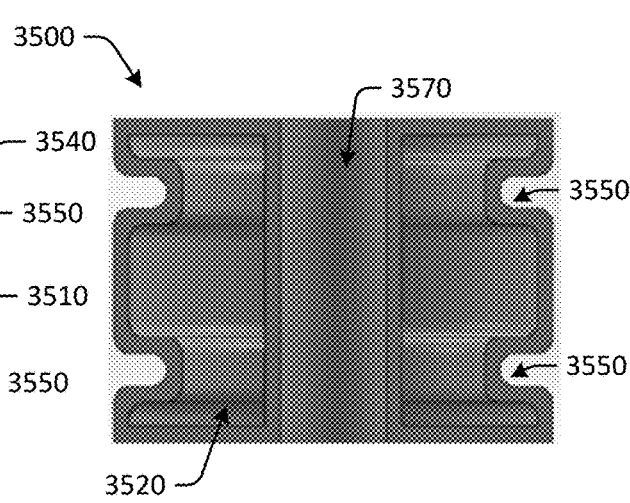
FIG. 35A
FIG. 35B
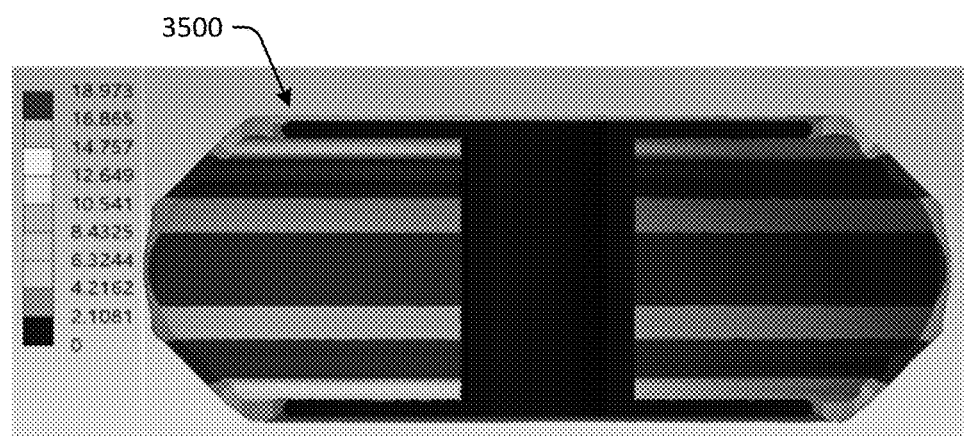
FIG. 35C

CORRUGATED DIAPHRAGM ACTUATOR

CROSS-REFERENCE TO RELATED APPLICATIONS

This application claims the benefit of, and priority to, U.S. Provisional Patent Application No. 63/163,620, filed on Mar. 19, 2021, and titled "Corrugated Diaphragm Actuator," the disclosure of which is expressly incorporated herein by reference in its entirety.

FIELD OF THE DISCLOSURE

The present disclosure relates generally to actuators and more particularly to soft actuators having a corrugated diaphragm that extends upon application of a positive pressure within a cavity of the actuator.

BACKGROUND OF THE DISCLOSURE

Actuators are important parts in many mechanical systems that provide a mechanism to generate force, movement, or a combination of both. Based on application and system need, the actuator can be designed to generate linear displacement, angular displacement, and force as well as to respond to external forces and moment (torque). Most current actuators are made with rigid metallic or polymeric materials and use electrical, magnetic, hydraulic, and pneumatic driven mechanisms for actuation. Although they are very successful in applying to robotics, machinery, and manufacturing environments, they have limitations in human-centered applications such as assistive devices, rehabilitation robotics, and consumer products due to compatibility and safety issues. A new class of actuators called soft actuators have been developed recently using flexible materials. These actuators leverage intrinsic material properties such as shape memory, and an electrolytic contraction or use specifically designed resizable chambers for actuation. Typically, soft actuators are lighter and less complex, and possess required compliance for interfacing with the human in assistive and rehabilitation applications. However, these actuators only include low force generation and have issues with linearity. Therefore, a need exists for a new type of versatile actuator concept that solves the issues with low force generation and linearity.

SUMMARY OF THE DISCLOSURE

The present disclosure provides corrugated diaphragm actuators and related devices, systems, and methods including a corrugated diaphragm actuator. In one aspect, a corrugated diaphragm actuator is provided. In one implementation, the corrugated diaphragm actuator may include a chamber body including a plurality of walls defining a cavity. The plurality of walls may include a first wall including a first corrugated diaphragm defining at least one first corrugated channel, and the corrugated diaphragm may be configured for expanding outwardly when a positive pressure is applied within the cavity.

In some implementations, the chamber body may have a cylindrical shape. In some implementations, the first wall may be a top wall or a bottom wall of the chamber body. In some implementations, the first wall may be a side wall of the chamber body. In some implementations, the at least one first corrugated channel may extend circumferentially around the chamber body. In some implementations, the at least one first corrugated channel may be centered on the first wall. In some implementations, the at least one first corrugated channel may not be centered on the first wall. In some implementations, a path of the at least one first corrugated channel may have a circular shape, an ovoid shape, or a polygonal shape. In some implementations, a cross-sectional shape of the at least one first corrugated channel is a rectangular shape, a V shape, a curved shape, or a parabolic shape. In some implementations, the at least one first corrugated channel may include a plurality of first corrugated channels spaced apart from one another. In some implementations, the first wall may have a planar profile. In some implementations, the first wall may have a curved profile. In some implementations, the first wall may have a circular shape, an ovoid shape, or a polygonal shape. In some implementations, a shape of a path of the at least one first corrugated channel may correspond to a shape of the first wall.

In some implementations, the plurality of walls also may include a second wall including a second corrugated diaphragm defining at least one second corrugated channel. In some implementations, the at least one first corrugated channel may have a depth that is constant along a path of the at least one first corrugated channel. In some implementations, the at least one first corrugated channel may have a depth that varies along a path of the at least one first corrugated channel. In some implementations, the chamber body may include a flexible component including at least the first wall and a rigid component including at least one additional wall of the plurality of walls. In some implementations, the corrugated diaphragm may be configured for expanding outwardly in a linear manner when the positive pressure is applied within the cavity. In some implementations, the corrugated diaphragm may be configured for expanding outwardly and bending at an angle when the positive pressure is applied within the cavity.

These and other aspects and improvements of the present disclosure will become apparent to one of ordinary skill in the art upon review of the following detailed description when taken in conjunction with the several drawings and the appended claims.

BRIEF DESCRIPTION OF THE DRAWINGS

FIG. 3 is a perspective view of a corrugated diaphragm actuator in accordance with implementations of the disclosure, with the actuator having a plurality of corrugated diaphragms.

FIG. 4 is a perspective view of a corrugated diaphragm actuator in accordance with implementations of the disclosure, with the actuator having a single corrugated diaphragm.

FIG. 5 is a perspective view of a corrugated diaphragm actuator in accordance with implementations of the disclosure, with the actuator having a plurality of corrugated diaphragms.

FIG. 6 is a perspective view of a corrugated diaphragm actuator in accordance with implementations of the disclosure, with the actuator having a plurality of corrugated diaphragms.

FIG. 13A is a perspective view of a corrugated diaphragm actuator in accordance with implementations of the disclosure, with the actuator having a single corrugated channel. FIG. 13B is a cross-sectional side view of the corrugated diaphragm actuator of FIG. 13A. FIG. 13C is a perspective view of a corrugated diaphragm actuator in accordance with implementations of the disclosure, with the actuator having two corrugated channels. FIG. 13D is a cross-sectional side view of the corrugated diaphragm actuator of FIG. 13C. FIG. 13E is a perspective view of a corrugated diaphragm actuator in accordance with implementations of the disclosure, with the actuator having three corrugated channels. FIG. 13F is a cross-sectional side view of the corrugated diaphragm actuator of FIG. 13E.

FIG. 19A is a perspective view of a corrugated diaphragm actuator in accordance with implementations of the disclosure, with the actuator having a centered corrugated channel. FIG. 19B is a cross-sectional side view of the corrugated diaphragm actuator of FIG. 19A. FIG. 19C is a cross-sectional side view of the corrugated diaphragm actuator of FIG. 19A, showing simulation data for expansion of the actuator. FIG. 19D is a perspective view of a corrugated diaphragm actuator in accordance with implementations of the disclosure, with the actuator having an off-centered corrugated channel. FIG. 19E is a cross-sectional side view of the corrugated diaphragm actuator of FIG. 19D. FIG. 19F is a cross-sectional side view of the corrugated diaphragm actuator of FIG. 19D, showing simulation data for expansion of the actuator.

FIG. 24A is a side view of an array of corrugated diaphragm actuators in series in accordance with implementations of the disclosure, showing the array before applying pressure to cavities of the actuators. FIG. 24B is a side view of the array of FIG. 24A, showing the array after applying equal pressure to the cavities of the actuators. FIG. 24C is a side view of the array of FIG. 24A, showing the array after applying different pressures to the cavities of the actuators. FIG. 24D is a side view of the array of FIG. 24A, with the array having actuators of different sizes, showing the array after applying pressure to the cavities of the actuators.

FIG. 31A is a schematic view of a helmet assembly having an array of corrugated diaphragm actuators for supporting a helmet in accordance with implementations of the disclosure. FIG. 31B is a side view of a portion of the helmet assembly of FIG. 31A before applying pressure to cavities of the actuators. FIG. 31C is a side view of a portion of the helmet assembly of FIG. 31A, showing simulation data after applying pressure to the cavities of the actuators for improving fit of the helmet. FIG. 31D is a side view of a portion of the helmet assembly of FIG. 31A, showing simulation data for deformation of the actuators after applying a vertical impact to the helmet. FIG. 31E is a side view of a portion of the helmet assembly of FIG. 31A, showing simulation data for deformation of the actuators after applying a lateral impact to the helmet.

FIG. 33A is a perspective view of a corrugated diaphragm actuator in accordance with implementations of the disclosure. FIG. 33B is a cross-sectional side view of the corrugated diaphragm actuator of FIG. 33A. FIG. 33C is a perspective view of the corrugated diaphragm actuator of FIG. 33A, showing simulation data for expansion of the actuator.

FIG. 35A is a perspective view of a corrugated diaphragm actuator in accordance with implementations of the disclosure. FIG. 35B is a cross-sectional side view of the corrugated diaphragm actuator of FIG. 35A. FIG. 35C is a cross-sectional side view of the corrugated diaphragm actuator of FIG. 35A, showing simulation data for expansion of the actuator.

Figure 1A:
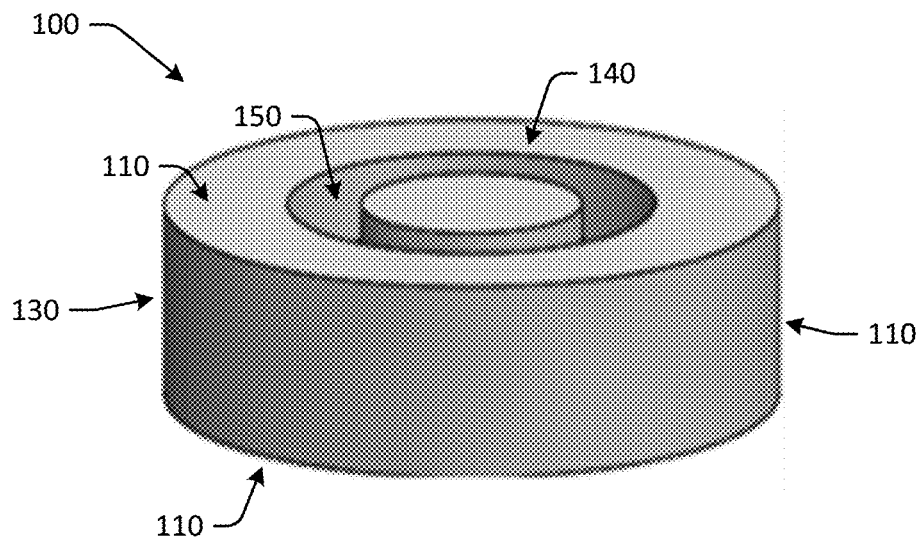
FIG. 1A is a perspective view of a corrugated diaphragm actuator in accordance with implementations of the disclosure, with the actuator having a single corrugated diaphragm.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, and/or components have not been described in detail so as not to unnecessarily obscure aspects of the embodiments.

Overview

The devices, systems, and methods described herein include an actuator that includes a chamber body. The chamber body includes a cavity and at least one wall. The at least one wall defines a corrugated channel. When the cavity is filled with a fluid, the chamber body expands such the at least one wall defining the corrugated channel extends.

Figure 1B:
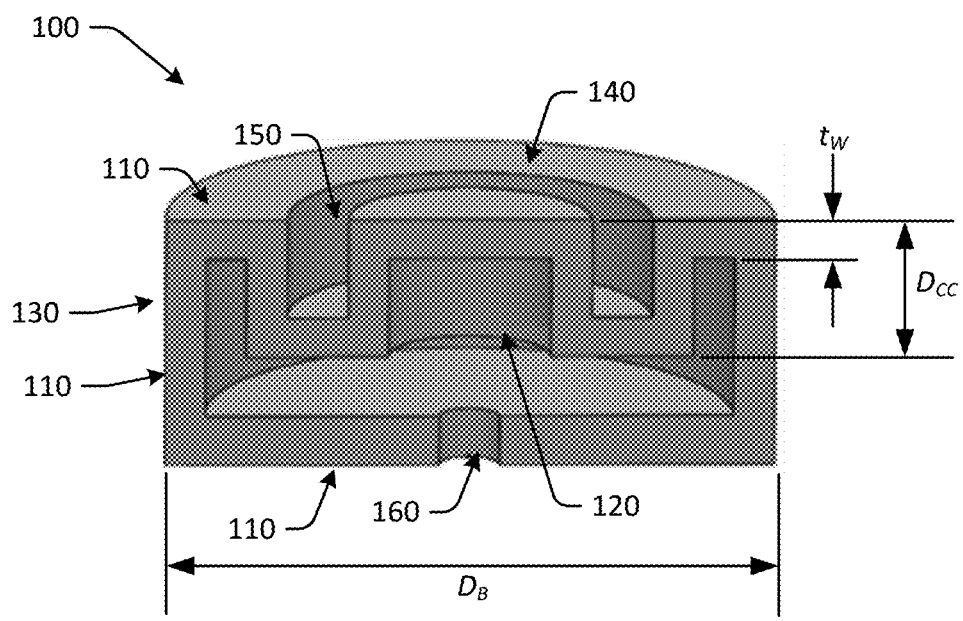
FIG. 1B is a cross-sectional perspective view of the corrugated diaphragm actuator of FIG. 1A.

Example Corrugated Diaphragm Actuators and Related Devices, Systems, and Methods FIGS. 1A-1B show a perspective view and a cross-sectional perspective view of a corrugated diaphragm actuator 100 that includes three connected walls 110 with a wall thickness $t_w$. The three walls define a chamber cavity 120 and form a cylindrical chamber body 130 with a diameter $D_B$. One of the walls includes a corrugated diaphragm 140. The corrugated diaphragm 140 of FIG. 1 defines one rectangular corrugated channel 150. The path of the corrugated channel 150 corresponds to the shape of the wall 110 that includes the corrugated diaphragm 140 and the depth of the corrugated channel $D_{CC}$. The depth of the corrugated channel $D_{CC}$ is measured from the uppermost point on the wall 110 that includes to corrugated diaphragm 140 to the lowermost point of the corrugated channel 150 plus the wall thickness. The wall 110 opposite the corrugated diaphragm 140 defines a fluid inlet 160. When pressure is applied through the fluid inlet 160 into the chamber cavity 120, the corrugated diaphragm 140 outwardly expands and provides both displacement and force.

Figure 1C:
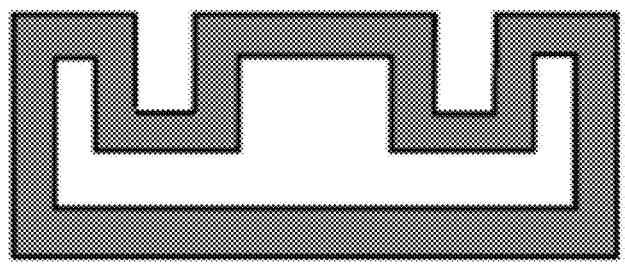
FIG. 1C is a cross-sectional side view of the corrugated diaphragm actuator of FIG. 1A without applying pressure within a cavity of the actuator.
Figure 1D:
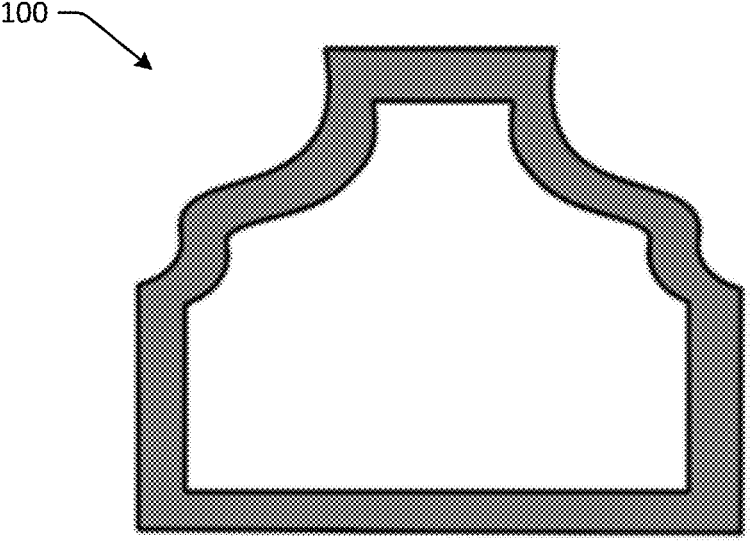
FIG. 1D is a cross-sectional side view of the corrugated diaphragm actuator of FIG. 1A after applying pressure within the cavity.

FIG. 1C shows a cross section schematic diagram of the corrugated diaphragm actuator 100 before pressure is applied through the fluid inlet 160 (not shown), and FIG. 1D shows a cross section schematic diagram of the corrugated diaphragm actuator 100 after pressure is applied through the fluid inlet 160 (also not shown). The pressure applied through the fluid inlet 160 can be through any kind of means of fluids such as air or liquid (pneumatic or hydraulic).

Figure 2:
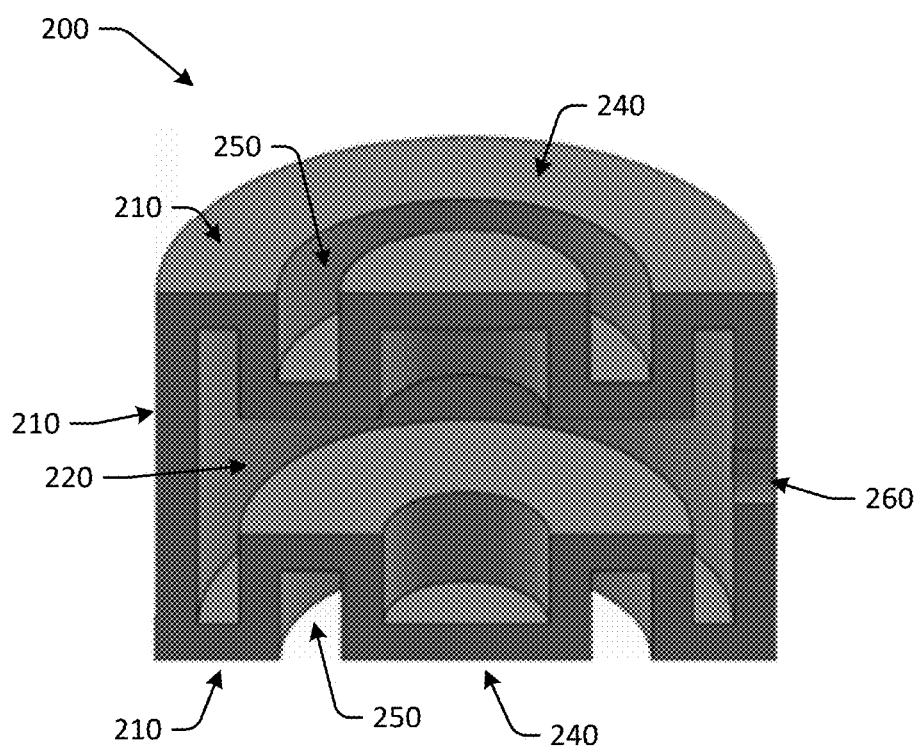
FIG. 2 is a cross-sectional perspective view of a corrugated diaphragm actuator in accordance with implementations of the disclosure, with the actuator having a pair of corrugated diaphragms.

In other implementations, and as shown in the cross section view in FIG. 2, the corrugated diaphragm actuator 200 includes two corrugated diaphragms 240 spaced opposite and apart from each other. The fluid inlet 260 of the corrugated diaphragm actuator 200 of FIG. 2 is defined on the wall 210 perpendicular both of the corrugated diaphragms 240 and is in fluid communication with the chamber cavity 220.

In another implementation, as shown in FIG. 3, the corrugated diaphragm actuator 300 also includes three walls 310 but includes more than two corrugated diaphragms 340 that are included on walls perpendicular to each other. Also, in FIG. 3, at least two of the corrugated channels 350 do not correspond to the shape of the wall 310 that includes the corrugated channels 350. In FIG. 4, the corrugated diaphragm actuator 400 includes eight walls 410 that form a hexagonal prism body 430. In FIG. 5, the corrugated diaphragm actuator 500 includes six walls 510 that form a cube body 530. In FIG. 6, the corrugated diaphragm actuator 600 includes five walls 610 that form a square pyramid body 630. In other implementations, the corrugated channel is ovate, rectangular, pentagonal, octagonal or any closed shape that does or not does not correspond to the shape of the face that includes the corrugated diaphragm. In other implementations, the walls of the corrugated diaphragm actuator form a sphere, cuboid, triangular prism, or any closed three-dimensional shape capable of forming a chamber cavity and including a corrugated diaphragm on at least one of the walls.

Figure 7:
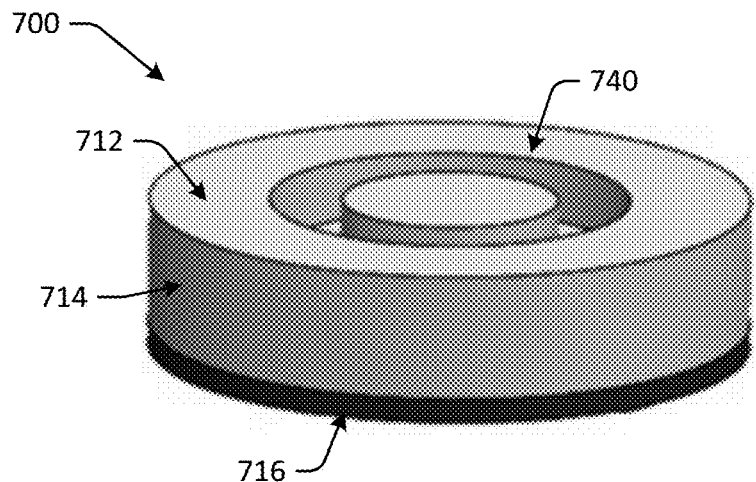
FIG. 7 is a perspective view of a corrugated diaphragm actuator in accordance with implementations of the disclosure, with the actuator including two components formed of different materials.
Figure 8:
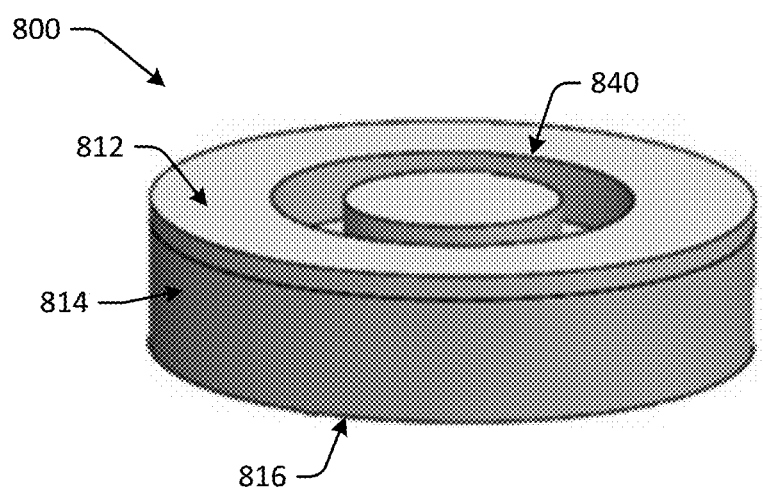
FIG. 8 is a perspective view of a corrugated diaphragm actuator in accordance with implementations of the disclosure, with the actuator including two components formed of different materials.

As shown in FIGS. 7 and 8, the corrugated diaphragm actuator may include a variety of materials and material combinations of components formed of different materials. FIG. 7 shows a corrugated diaphragm actuator 700 that includes two components formed of different materials. The wall 712 that includes the corrugated diaphragm 740 and the chamber side wall 714 perpendicular the wall 712 that includes the corrugated diaphragm 740 are formed of a first material, and the chamber bottom wall 716 opposite the corrugated diaphragm is formed of a second material that is different from the first materials. In some implementations, the first material may be polyurethane, and the second material may be a metal. In some implementations, the first material may be silicone rubber, and the second material may be a rigid plastic. FIG. 8 shows a corrugated diaphragm actuator 800 that includes two components formed of different materials. The wall 812 that includes the corrugated diaphragm 840 is formed of a first material, such as silicone rubber, and the chamber bottom wall 816 opposite the corrugated diaphragm 840 and the chamber wall 814 perpendicular the corrugated diaphragm 840 is formed of a different, second material, such as a metal. In other implementations, the corrugated diaphragm actuator includes a flexible polymer, metal, plastic, hyperplastic, any material, or any combination thereof such that the corrugated diaphragm includes material or materials flexible enough for expansion.

The corrugated diaphragm actuator as discussed herein, can be utilized for providing linear displacement, providing angular displacement, applying force and torque, and/or reacting to external forces. The performance of the corrugated diaphragm actuator can be modified through changing geometrical features of the corrugated diaphragm, chamber body, materials, pressure inside the chamber cavity, and actuation medium (pneumatic or hydraulic).

Figure 9A:
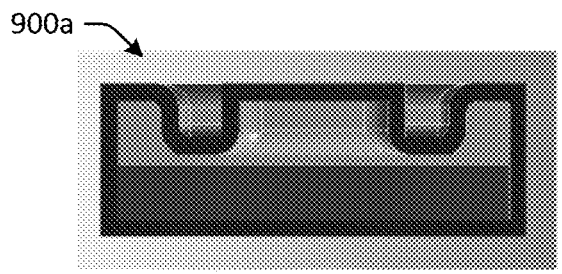
FIG. 9A is a cross-sectional side view of a corrugated diaphragm actuator in accordance with implementations of the disclosure.
Figure 9C:
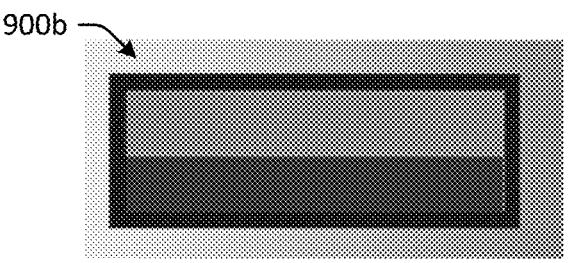
FIG. 9C is a cross-sectional side view of a non-corrugated diaphragm actuator.
Figure 9B:
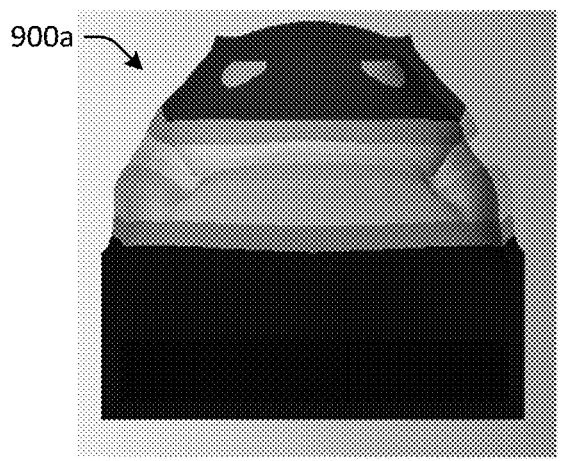
FIG. 9B is a cross-sectional side view of the corrugated diaphragm actuator of FIG. 9A, showing simulation data for expansion of the actuator.
Figure 9D:
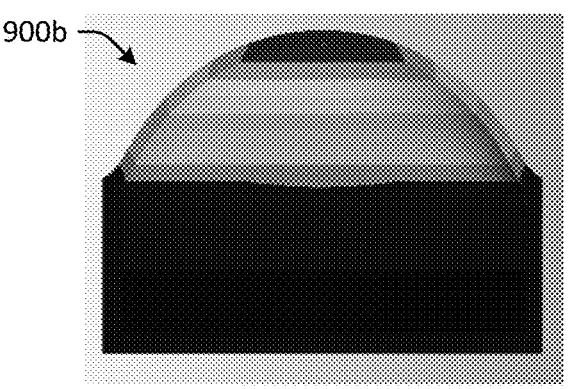
FIG. 9D is a cross-sectional side view of the non-corrugated diaphragm actuator of FIG. 9C, showing simulation data for expansion of the actuator.
Figure 9E:
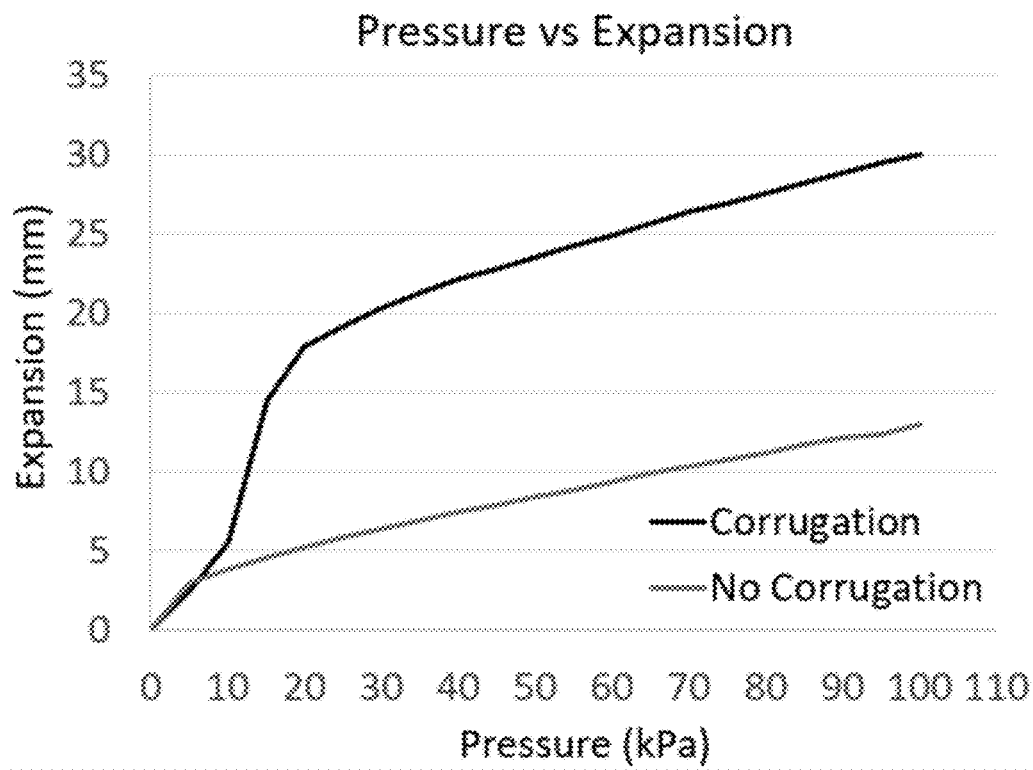
FIG. 9E is a graph of expansion length as a function of pressure applied for the corrugated diaphragm actuator of FIG. 9A and the non-corrugated diaphragm actuator of FIG. 9C.

FIGS. 9A-9D illustrate a comparison of a corrugated diaphragm actuator 900a similar to the corrugated diaphragm actuator 100 describes above and a non-corrugated diaphragm actuator 900b. As shown in FIG. 9E, the use of a corrugated diaphragm allows for a greater degree of expansion at the same pressure applied.

Figure 10A:
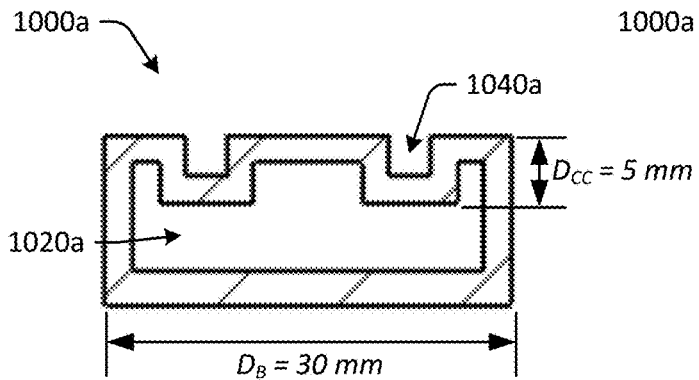
FIG. 10A is a cross-sectional side view of a corrugated diaphragm actuator in accordance with implementations of the disclosure.
Figure 10B:
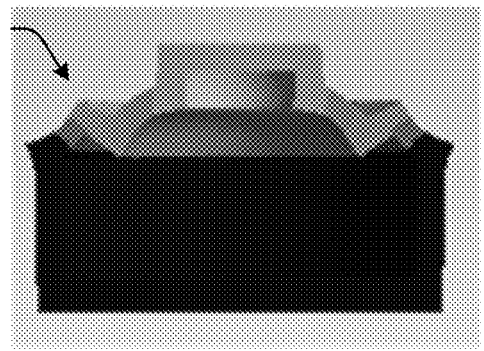
FIG. 10B is a cross-sectional side view of the corrugated diaphragm actuator of FIG. 10A, showing simulation data for expansion of the actuator.
Figure 10C:
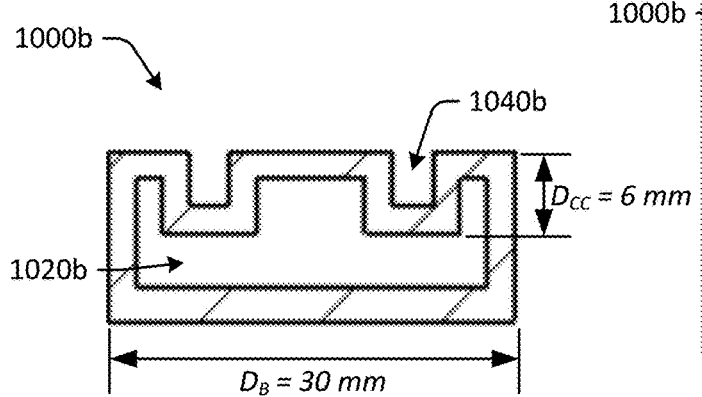
FIG. 10C is a cross-sectional side view of a corrugated diaphragm actuator in accordance with implementations of the disclosure.
Figure 10D:
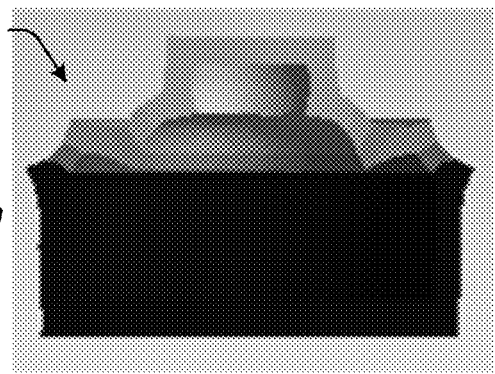
FIG. 10D is a cross-sectional side view of the corrugated diaphragm actuator of FIG. 10C, showing simulation data for expansion of the actuator.
Figure 10E:
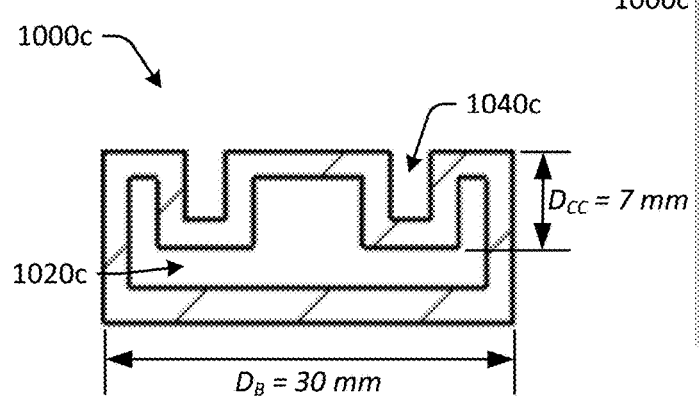
FIG. 10E is a cross-sectional side view of a corrugated diaphragm actuator in accordance with implementations of the disclosure.
Figure 10F:
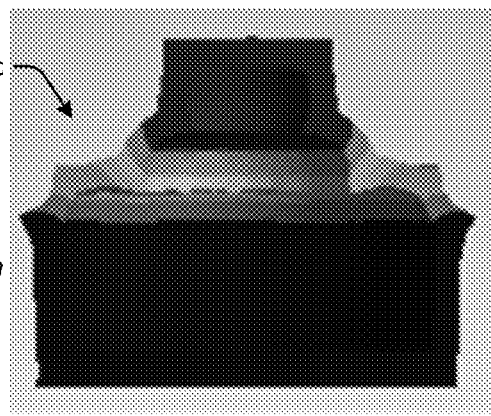
FIG. 10F is a cross-sectional side view of the corrugated diaphragm actuator of FIG. 10E, showing simulation data for expansion of the actuator.

Regarding the corrugated diaphragm actuator providing linear displacement, FIGS. 10A, 10C, and 10E show cross sectional schematics of three implementations of corrugated diaphragm actuators 1000a, 1000b, 1000c that all include the same base diameter $D_B$, 30 mm, but vary in the depth of the corrugated channel depth, $D_{CC}$, from 5 mm to 6 mm to 7 mm. FIGS. 10B, 10D, and 10F illustrate simulations of expansion of the same implementations of the corrugated diaphragm actuators 1000a, 1000b, 1000c, respectively. FIGS. 10B, 10D, and 10F illustrate the linear displacement of each of the corrugated diaphragms 1040a, 1040b, 1040c when the same internal pressure is applied within each of the chamber cavities 1020a, 1020b, 1020c of the corrugated diaphragm actuators 1000a, 1000b, 1000c.

Figure 10G:
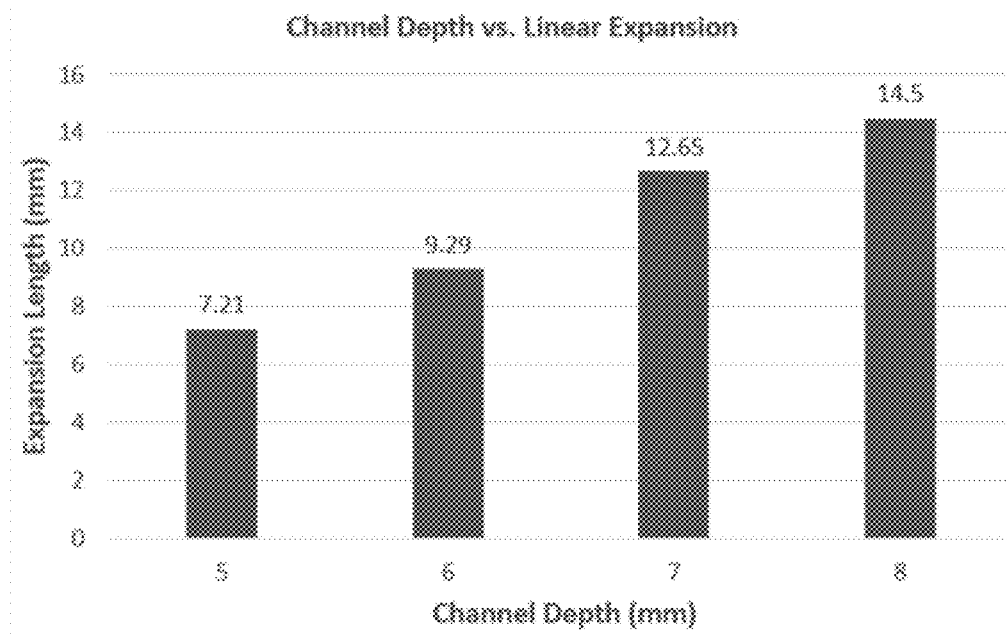
FIG. 10G is a graph of expansion length as a function of channel depth.

FIG. 10G illustrates the linear displacement values plotted against the corrugated channel depth $D_{CC}$ for the implementation of the corrugated diaphragm actuator 100 shown in FIG. 1. The position at the top of the corrugated diaphragm 140 when no applied pressure is the zero point. As shown in FIGS. 10B, 10D, 10F, and 10G, the expansion length/linear displacement of the corrugated diaphragm increases when the corrugated channel depth $D_{CC}$ increases.

Figure 11:
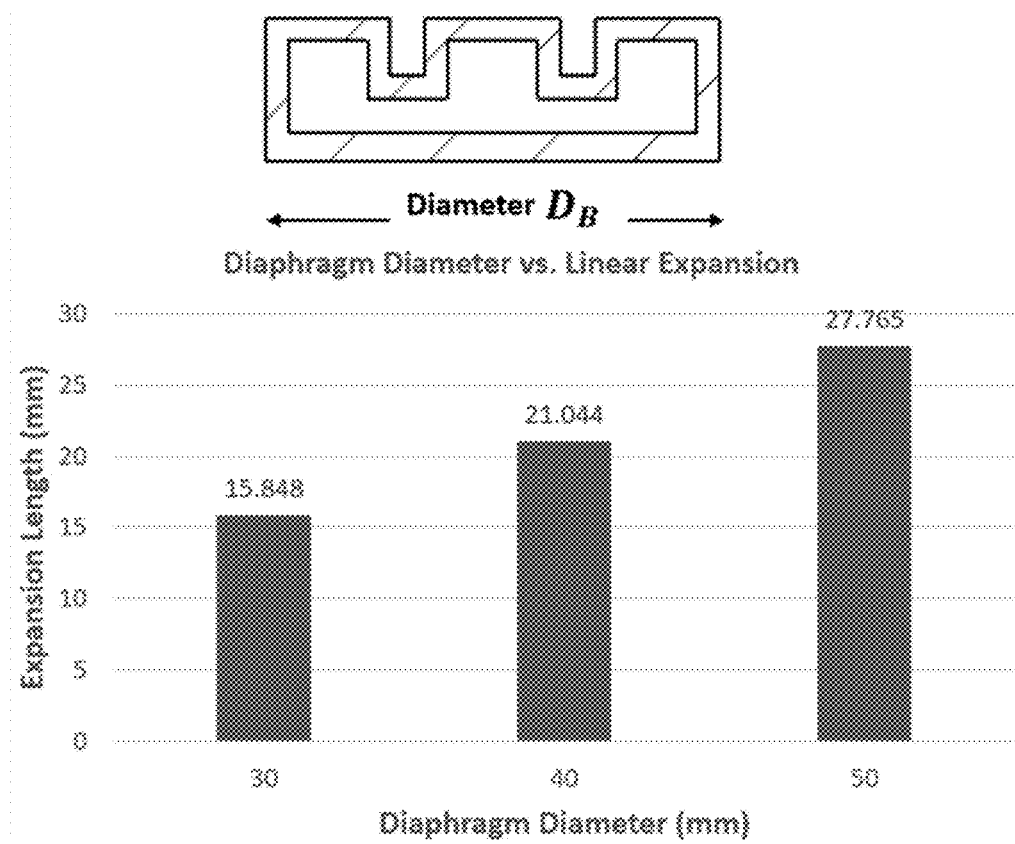
FIG. 11 is a graph of expansion length as a function of diaphragm diameter.
Figure 12A:
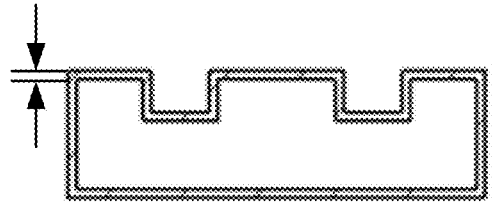
FIG. 12A is a cross-sectional side view of a corrugated diaphragm actuator in accordance with implementations of the disclosure.
Figure 12B:
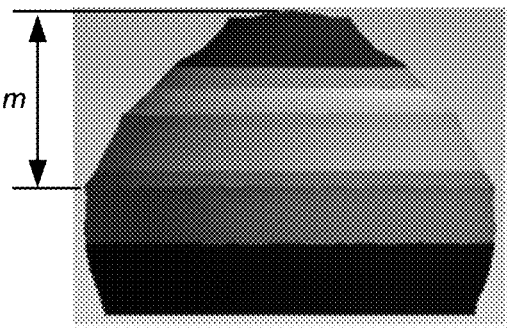
FIG. 12B is a cross-sectional side view of the corrugated diaphragm actuator of FIG. 12A, showing simulation data for expansion of the actuator.
Figure 12C:
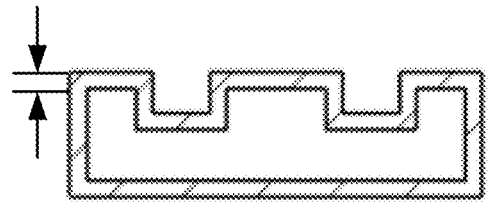
FIG. 12C is a cross-sectional side view of a corrugated diaphragm actuator in accordance with implementations of the disclosure.
Figure 12D:
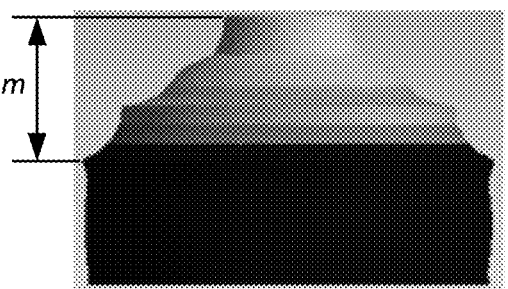
FIG. 12D is a cross-sectional side view of the corrugated diaphragm actuator of FIG. 12C, showing simulation data for expansion of the actuator.
Figure 12E:
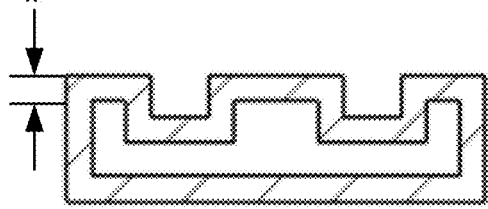
FIG. 12E is a cross-sectional side view of a corrugated diaphragm actuator in accordance with implementations of the disclosure.
Figure 12F:
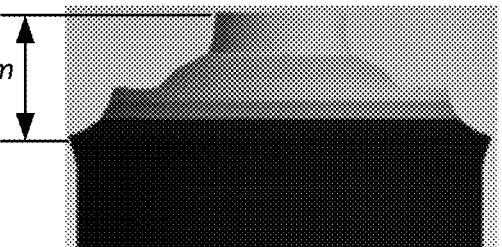
FIG. 12F is a cross-sectional side view of the corrugated diaphragm actuator of FIG. 12E, showing simulation data for expansion of the actuator.
Figure 12G:
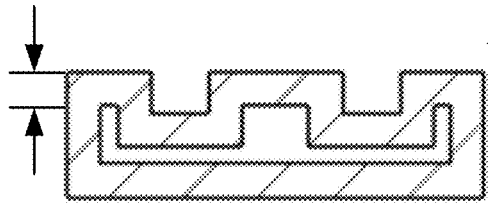
FIG. 12G is a cross-sectional side view of a corrugated diaphragm actuator in accordance with implementations of the disclosure.
Figure 12H:
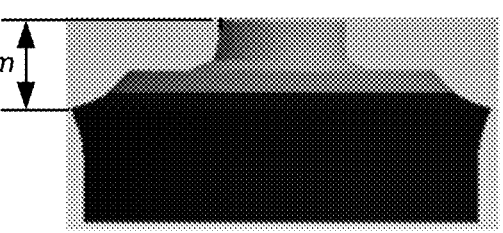
FIG. 12H is a cross-sectional side view of the corrugated diaphragm actuator of FIG. 12G, showing simulation data for expansion of the actuator.

Furthermore, increasing the base diameter $D_B$ of the corrugated diaphragm actuator also affects the linear expansion length/linear displacement of the corrugated diaphragm. FIG. 11 illustrates the displacement characteristics of the implementation of the corrugated diaphragm actuator 100 shown in FIG. 1 plotted against the base diameter $D_B$ of the implementation of the corrugated diaphragm actuator 100 shown in FIG. 1. All other geometries, including chamber height and depth of the corrugated channel, are the same. The applied pressure for each actuator is also the same. As shown in FIG. 11, as the base diameter $D_B$ of the corrugated diaphragm actuator 100 increases, the expansion length/linear displacement of the corrugated diaphragm 140 also increases.

The wall thickness $t_w$ of the corrugated diaphragm actuator is another characteristic that can be modified to change the linear expansion length/linear displacement of the corrugated diaphragm. For instance, FIGS. 12A-12H show the difference in linear expansion length when the wall thickness $t_w$ of implementations of corrugated diaphragm actuators similar in configuration to that of the corrugated diaphragm actuator 100 of FIG. 1 with varying $t_w$, 1 mm, 2 mm, 3 mm, and 4 mm. All the other geometrical parameters of the actuator and inflation pressure of the actuators are identical. In some implementations, compliance of the actuator is inversely proportional to thickness $t_w$ of the walls of the corrugated diaphragm actuator.

Figure 13G:
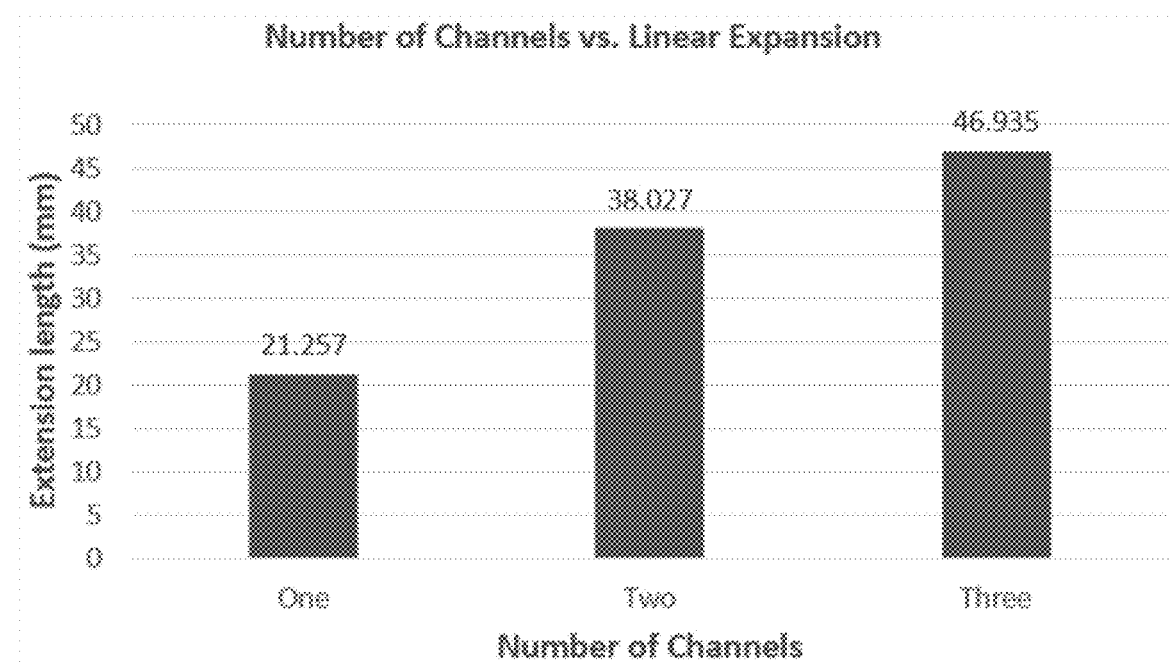
FIG. 13G is a graph of expansion length as a function of the number of channels.

The number of corrugated channels also affects the linear expansion length/linear displacement of the corrugated diaphragm. The corrugated diaphragm actuator 1300a shown in FIGS. 13A and 13B includes one corrugated channel 1350a, the corrugated diaphragm actuator 1300b shown in FIGS. 13C and 13D includes two corrugated channels 1350b, and the corrugated diaphragm actuator 1300 shown in FIGS. 13E and 13F includes three corrugated channels 1350c. As shown in the graph in FIG. 13G, the linear expansion length/linear displacement of the corrugated diaphragm increases as the number of corrugated channel increases.

Figure 14A:
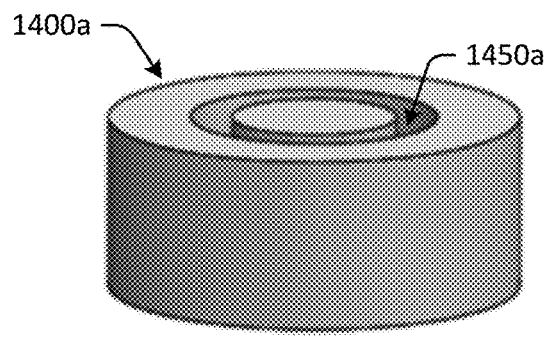
FIG. 14A is a perspective view of a corrugated diaphragm actuator in accordance with implementations of the disclosure, with the actuator having a corrugated channel with a rectangular shape.
Figure 14B:
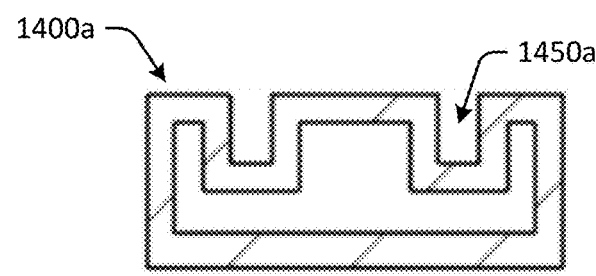
FIG. 14B is a cross-sectional side view of the corrugated diaphragm actuator of FIG. 14A.
Figure 14C:
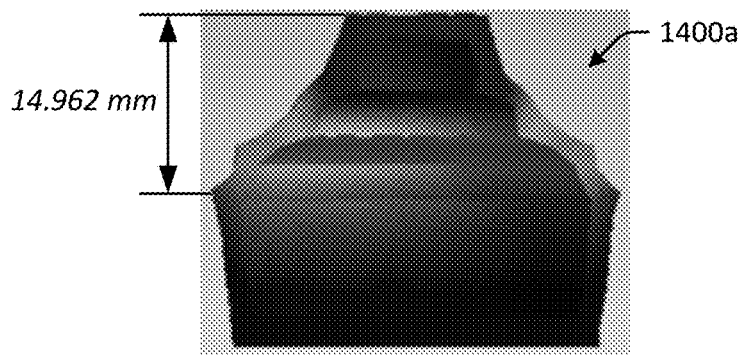
FIG. 14C is a cross-sectional side view of the corrugated diaphragm actuator of FIG. 14A, showing simulation data for expansion of the actuator.
Figure 14D:
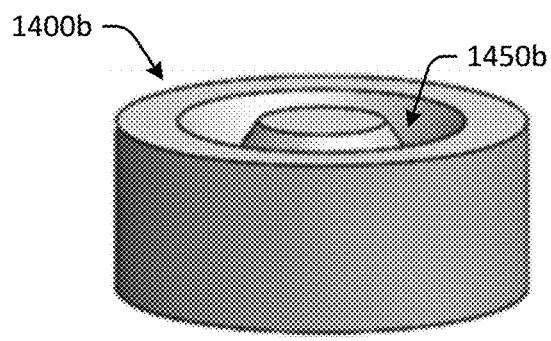
FIG. 14D is a perspective view of a corrugated diaphragm actuator in accordance with implementations of the disclosure, with the actuator having a corrugated channel with a V shape.
Figure 14E:
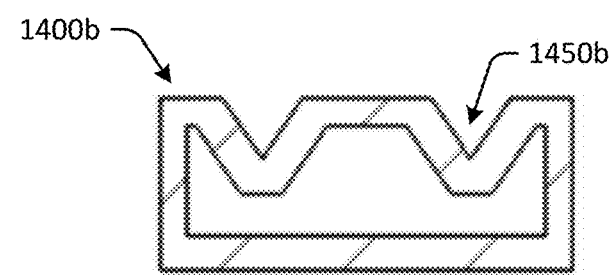
FIG. 14E is a cross-sectional side view of the corrugated diaphragm actuator of FIG. 14D.
Figure 14F:
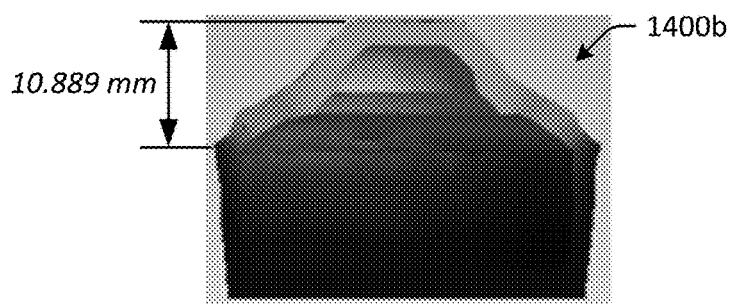
FIG. 14F is a cross-sectional side view of the corrugated diaphragm actuator of FIG. 14D, showing simulation data for expansion of the actuator.
Figure 14G:
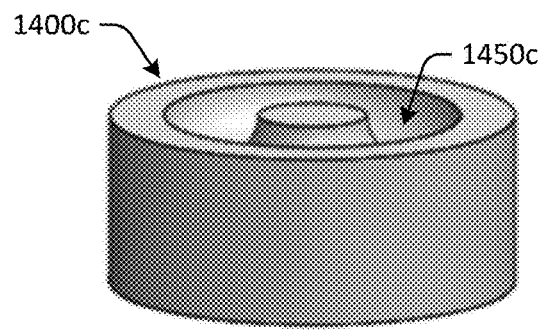
FIG. 14G is a perspective view of a corrugated diaphragm actuator in accordance with implementations of the disclosure, with the actuator having a corrugated channel with a rounded shape.
Figure 14H:
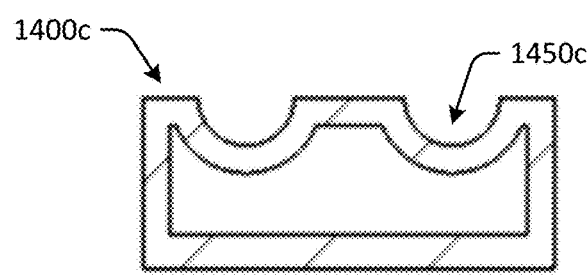
FIG. 14H is a cross-sectional side view of the corrugated diaphragm actuator of FIG. 14G.
Figure 14I:
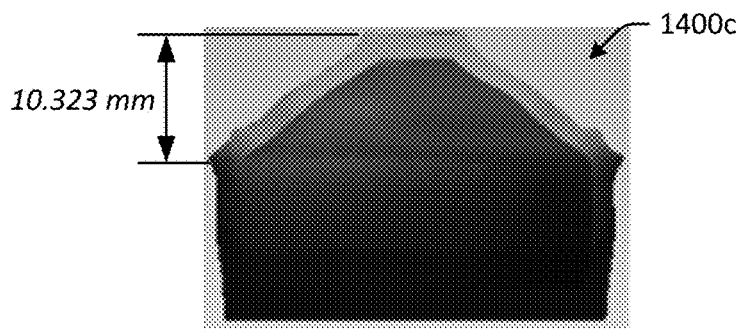
FIG. 14I is a cross-sectional side view of the corrugated diaphragm actuator of FIG. 14H, showing simulation data for expansion of the actuator.
Figure 14J:
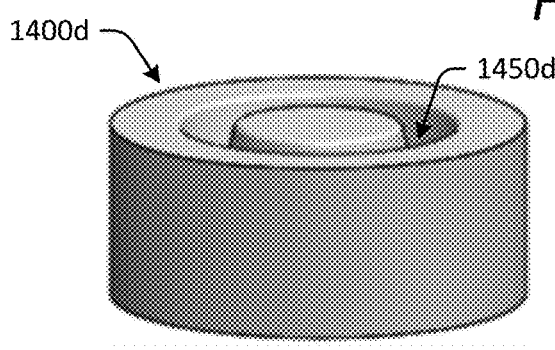
FIG. 14J is a perspective view of a corrugated diaphragm actuator in accordance with implementations of the disclosure, with the actuator having a corrugated channel with a parabolic shape.
Figure 14K:
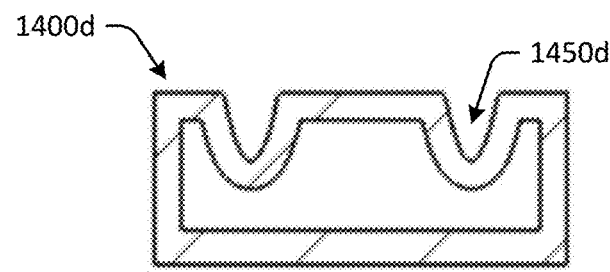
FIG. 14K is a cross-sectional side view of the corrugated diaphragm actuator of FIG. 14J.
Figure 14L:
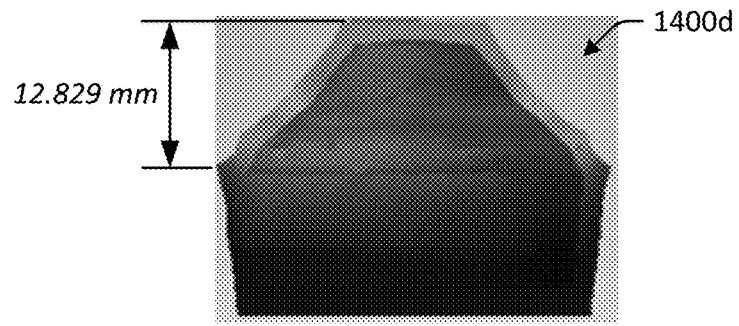
FIG. 14L is a cross-sectional side view of the corrugated diaphragm actuator of FIG. 14I, showing simulation data for expansion of the actuator.

The shape of the corrugated channel can be varied to further change the linear expansion length/linear displacement and also the expanded shape of the corrugated diaphragm. FIGS. 14A-14C show an implementation of the corrugated diaphragm actuator 1400a with rectangular corrugated channels 1450a. FIGS. 14D-14F show an implementation of the corrugated diaphragm actuator 1400b with V-shaped corrugated channels 1450b. FIGS. 14G-14I show an implementation of the corrugated diaphragm actuator 1400c with rounded corrugated channels 1450c. FIGS. 14J-14L show an implementation of the corrugated diaphragm actuator 1400d with parabolic corrugated channels 1450d. As shown in FIGS. 14C, 14F, 14I, and 14L, the shape of the channels affects the linear expansion length and the expanded shape of the corrugated diagram. In other implementations, the corrugated diaphragm includes corrugated channels in any closed or open shape and any combination of corrugated channels in the same or different shapes.

Figure 15A:
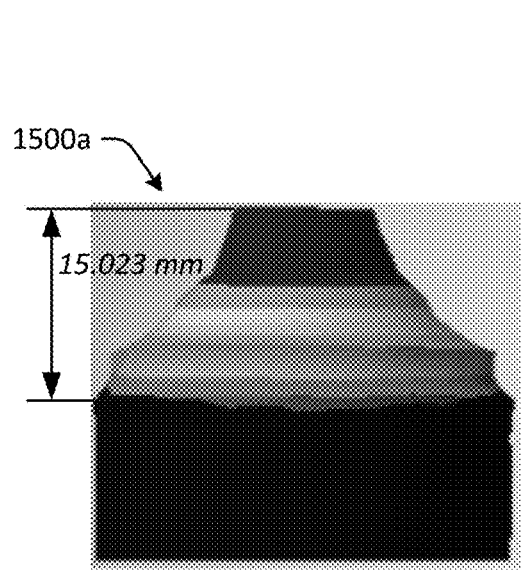
FIG. 15A is a side view of a corrugated diaphragm actuator having a single corrugated diaphragm in accordance with implementations of the disclosure, showing simulation data for expansion of the actuator.
Figure 15B:
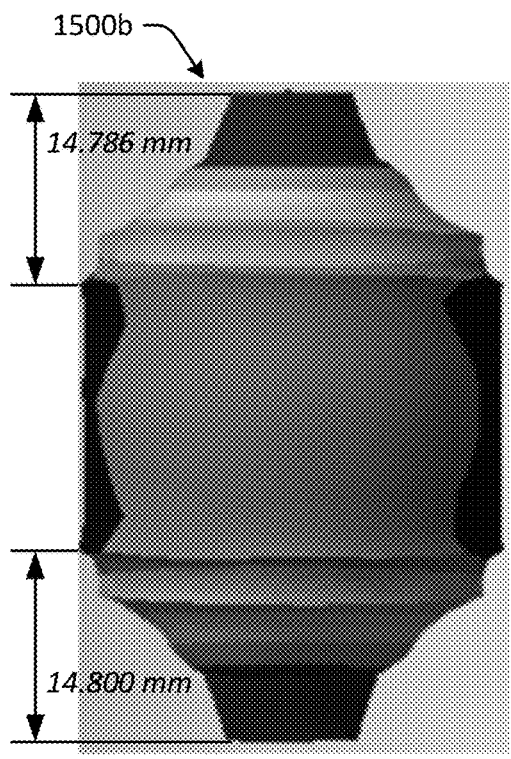
FIG. 15B is a side view of a corrugated diaphragm actuator having a pair of oppositely disposed corrugated diaphragms in accordance with implementations of the disclosure, showing simulation data for expansion of the actuator.

Also, as discussed previously and shown in the implementation of the corrugated diaphragm actuator in FIG. 2, the corrugated diaphragm actuator may include two corrugated diaphragms opposite each other. In some implementations, having two corrugated diaphragms opposite each other increases the linear expansion length of the entire corrugated diaphragm actuator such that the linear expansion length is almost doubled. For comparison, FIG. 15A shows the linear expansion of a corrugated diaphragm actuator similar to the implementation of the corrugated diaphragm actuator 100 shown in FIG. 1, and FIG. 15B shows the linear expansion of a corrugated diaphragm actuator similar to the implementation of the corrugated diaphragm actuator 200 shown in FIG. 2.

Figure 16:
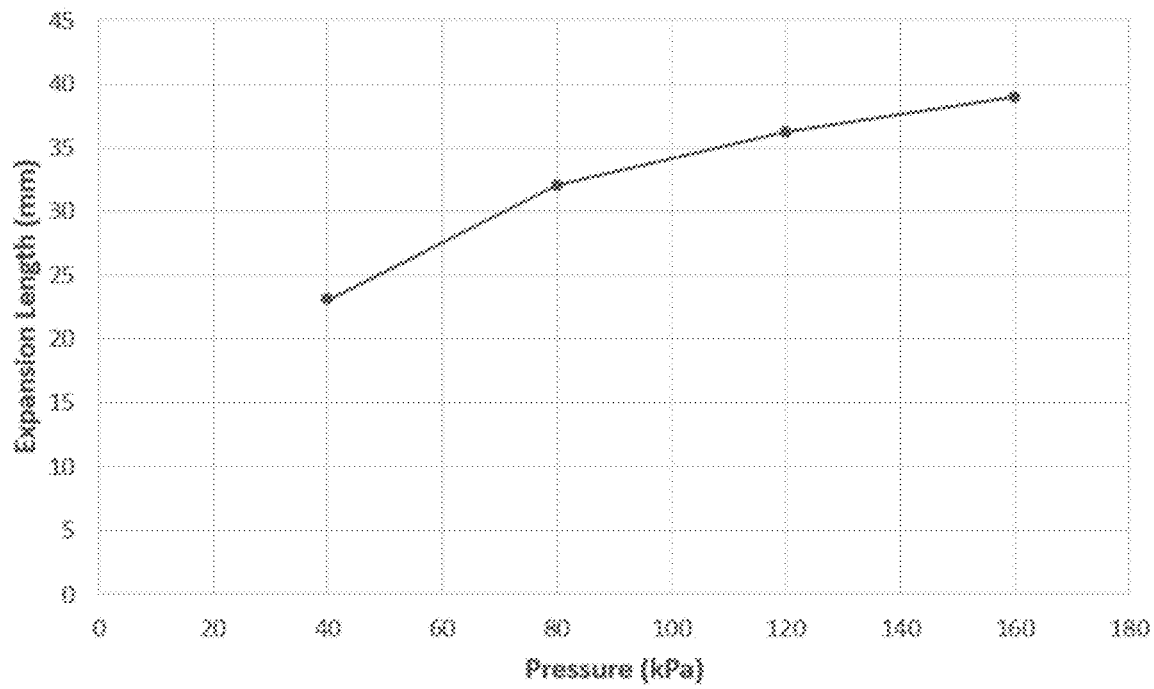
FIG. 16 is a graph of expansion length as a function of pressure applied for a corrugated diaphragm actuator having a single corrugated diaphragm in accordance with implementations of the disclosure.

The pressure that enters the chamber cavity through the fluid inlet of the corrugated diaphragm actuator also effects linear expansion length. The graph shown in FIG. 16 shows the change in linear expansion length plotted against applied pressure for the implementation of the corrugated diaphragm actuator of FIG. 1.

Figure 17A:
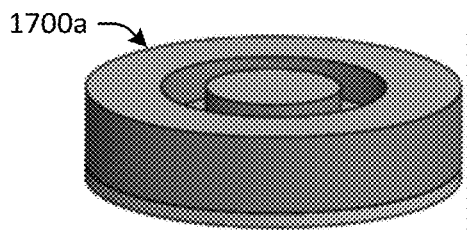
FIG. 17A is a perspective view of a corrugated diaphragm actuator in accordance with implementations of the disclosure, with the actuator including two components formed of different materials.
Figure 17B:
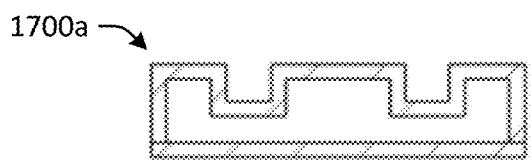
FIG. 17B is a cross-sectional side view of the corrugated diaphragm actuator of FIG. 17A.
Figure 17C:
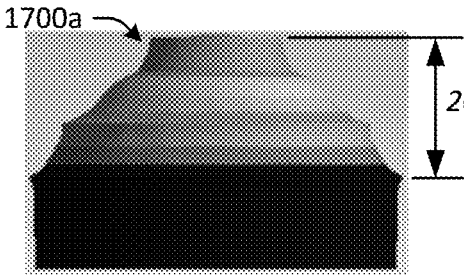
FIG. 17C is a side view of the corrugated diaphragm actuator of FIG. 17A, showing simulation data for expansion of the actuator.
Figure 17D:
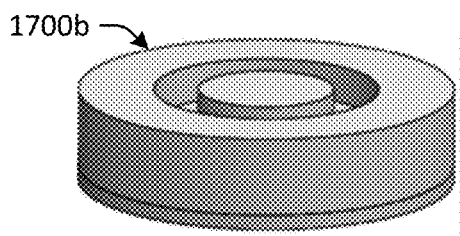
FIG. 17D is a perspective view of a corrugated diaphragm actuator in accordance with implementations of the disclosure, with the actuator including two components formed of different materials.
Figure 17E:
FIG. 17E is a cross-sectional side view of the corrugated diaphragm actuator of FIG. 17D.
Figure 17F:
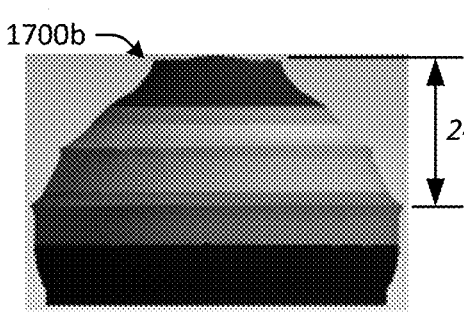
FIG. 17F is a side view of the corrugated diaphragm actuator of FIG. 17D, showing simulation data for expansion of the actuator.
Figure 17G:
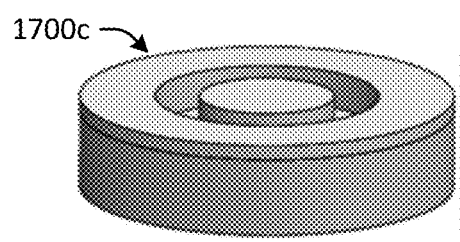
FIG. 17G is a perspective view of a corrugated diaphragm actuator in accordance with implementations of the disclosure, with the actuator including two components formed of different materials.
Figure 17H:
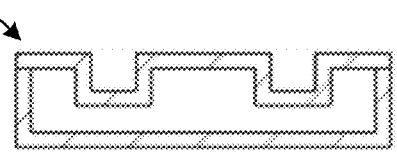
FIG. 17H is a cross-sectional side view of the corrugated diaphragm actuator of FIG. 17G.
Figure 17I:
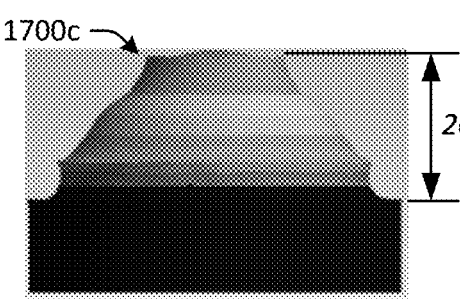
FIG. 17I is a side view of the corrugated diaphragm actuator of FIG. 17G, showing simulation data for expansion of the actuator.

The materials included in the corrugated diaphragm actuator also affect the linear expansion length/linear displacement of the corrugated diaphragm, as shown in FIGS. 17A-17I. In FIGS. 17A-17C, the corrugated diaphragm actuator 1700a includes a base component formed of structural steel and an upper component formed of polyurethane rubber (PMC-724). In FIGS. 17D-17F, the corrugated diaphragm actuator 1700b includes a base component formed of structural steel and an upper component formed of silicone rubber (RTV-4234-T4). In FIGS. 17G-17I, the corrugated diaphragm actuator 1700c includes a lower component formed of structural steel and a top component formed of silicone rubber (RTV-4234-T4). In some implementations, if a corrugated diaphragm actuator includes stiffer materials, the corrugated diaphragm will linearly expand to a lesser degree than if the corrugated diaphragm actuator included more flexible materials.

The slant of the corrugated channel depth and the location of the corrugated channel (or channels) affect the expansion direction of the corrugated diaphragm. FIGS. 18A-18F show implementations that are similar to the implementation of the corrugated diaphragm actuator shown in FIG. 1, but each with an increasing slant to the corrugated channel.

Figure 18A:
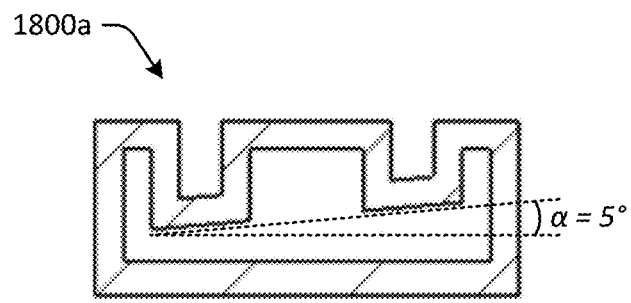
FIG. 18A is a cross-sectional side view of a corrugated diaphragm actuator in accordance with implementations of the disclosure, with the actuator having a slanted corrugated channel.
Figure 18B:
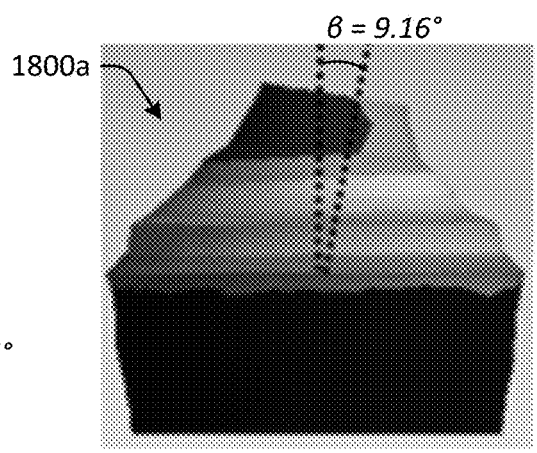
FIG. 18B is a side view of the corrugated diaphragm actuator of FIG. 18A, showing simulation data for expansion of the actuator.
Figure 18C:
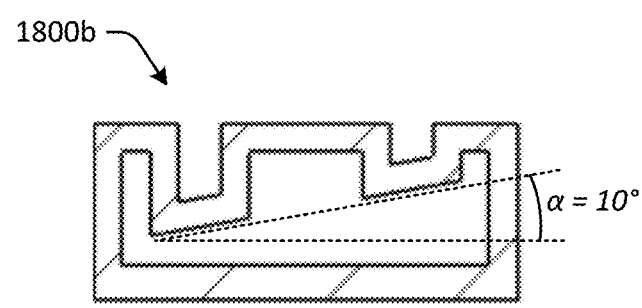
FIG. 18C is a cross-sectional side view of a corrugated diaphragm actuator in accordance with implementations of the disclosure, with the actuator having a slanted corrugated channel.
Figure 18D:
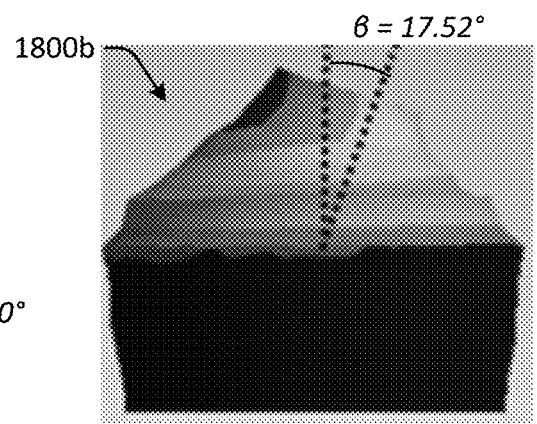
FIG. 18D is a side view of the corrugated diaphragm actuator of FIG. 18C, showing simulation data for expansion of the actuator.
Figure 18E:
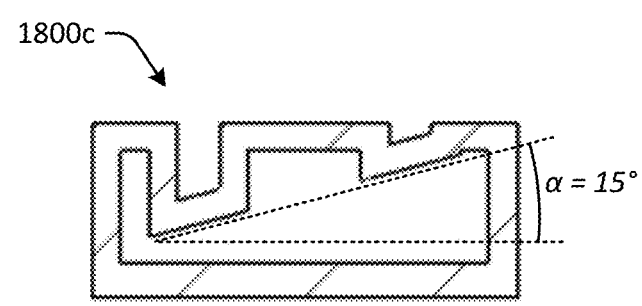
FIG. 18E is a cross-sectional side view of a corrugated diaphragm actuator in accordance with implementations of the disclosure, with the actuator having a slanted corrugated channel.
Figure 18F:
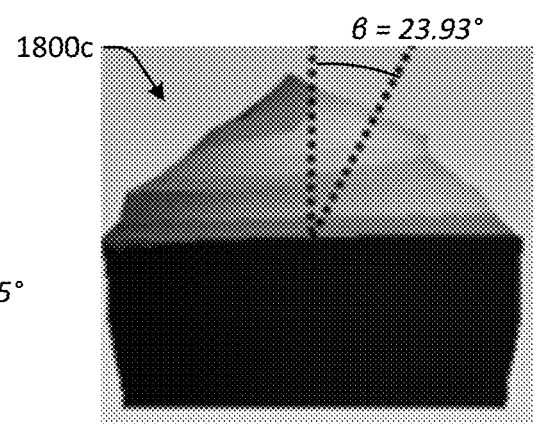
FIG. 18F is a side view of the corrugated diaphragm actuator of FIG. 18E, showing simulation data for expansion of the actuator.
Figure 18G:
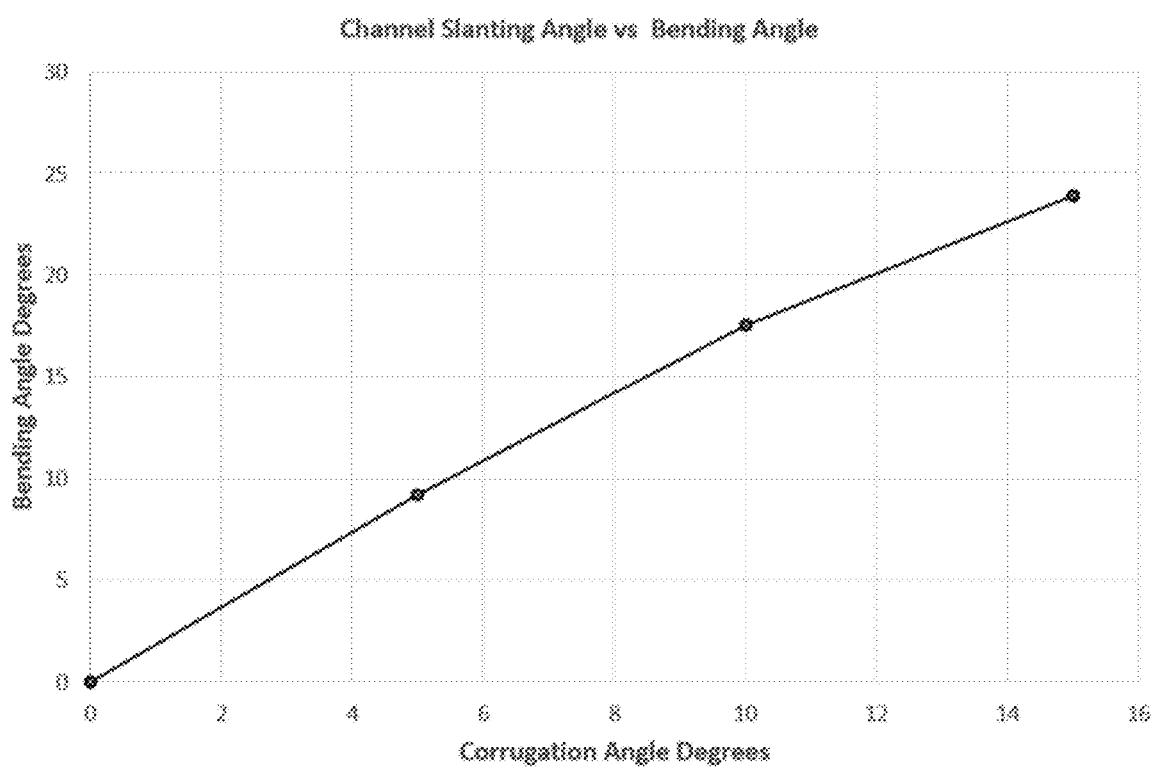
FIG. 18G is a graph of bending angle as a function of corrugation slanting angle.

Specifically, the corrugated diaphragm actuator 1800a shown in a schematic in FIG. 18A and simulated in FIG. 18B includes a corrugated channel angle $\alpha$ of 5 degrees which leads to a bending angle $\beta$ of 9.16 degrees when pressure enters the chamber cavity. Another implementation of a corrugated diaphragm actuator 1800b shown in a schematic in FIG. 18C and simulated in FIG. 18D includes a corrugated channel angle $\alpha$ of 10 degrees which leads to a bending angle $\beta$ of 17.52 degrees when pressure enters the chamber cavity. An even further implementation of a corrugated diaphragm actuator 1800c as shown in a schematic in FIG. 18E and simulated in FIG. 18F includes a corrugated channel angle $\alpha$ of 15 degrees which leads to a bending angle $\beta$ of 23.93 degrees when pressure enters the chamber cavity. In some implementations, the corrugated channel is any angle between 0 to 90 degrees. The relationship between the corrugated channel angle and the bending angle of the corrugated diaphragm is shown in the graph in FIG. 18G. As shown in FIG. 18G, as the corrugated channel angle increases, the bending angle of the corrugated diaphragm also increases.

Further affecting the bending angle of the corrugated diaphragm is the location of the corrugated channel (or channels). To illustrate the degree that the location of the corrugated channel effects the bending angle of the corrugated diaphragm, FIGS. 19A-19C illustrate a corrugated diaphragm actuator 1900a similar to the implementation shown in FIG. 1 where the corrugated channel 1950a is centered. The implementation of the corrugated diaphragm actuator 1900b shown in FIGS. 19D-19F includes a corrugated channel 1950b that is located off center. The off-center location of the corrugated channel 1950b creates a bending angle $\beta$ of 14.794 degrees. In other implementations, the corrugated channel is at any location such that the bending angle is optimized for the preferred application.

Figure 20A:
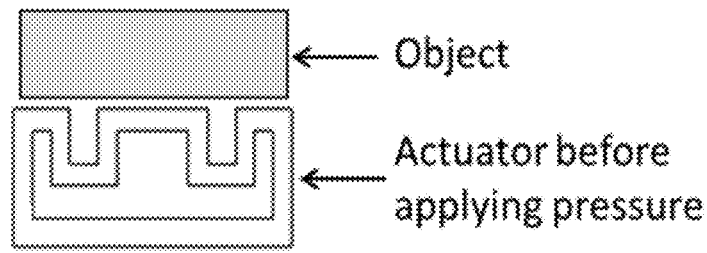
FIG. 20A is a schematic diagram of a corrugated diaphragm actuator in accordance with implementations of the disclosure, with an object placed on the actuator before applying pressure within a cavity of the actuator.
Figure 20B:
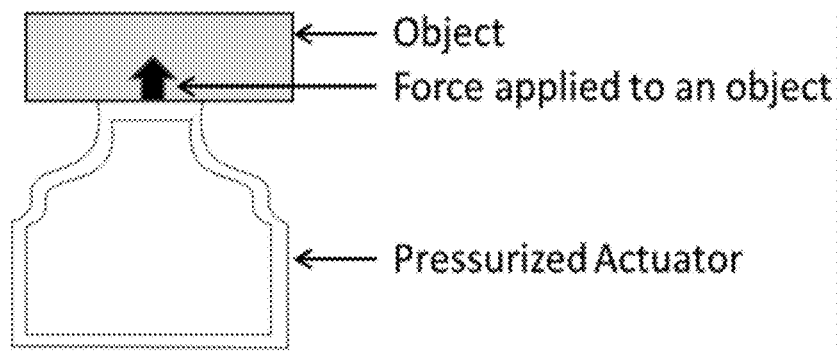
FIG. 20B is a schematic diagram of the corrugated diaphragm actuator and the object of FIG. 20A after applying pressure within the cavity.
Figure 20C:
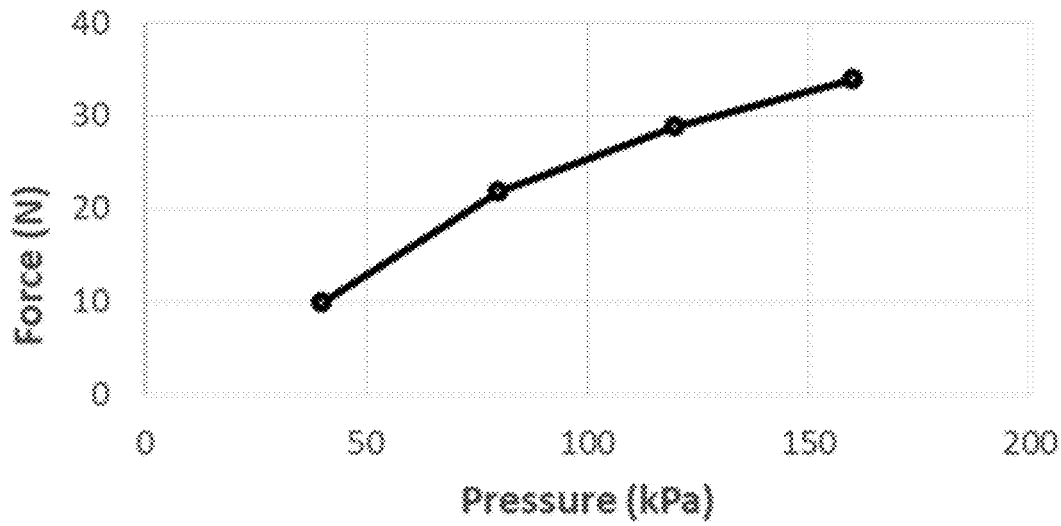
FIG. 20C is a graph of force generated by the actuator as a function of pressure applied.
Figure 21A:
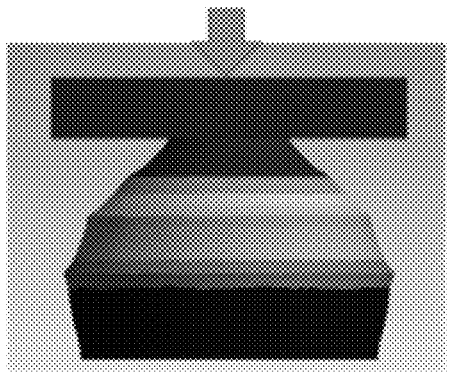
FIG. 21A is a side view of a corrugated diaphragm actuator in accordance with implementations of the disclosure, showing simulation data for expansion of the actuator and an impact force being applied opposite the actuation direction of the actuator.
Figure 21B:
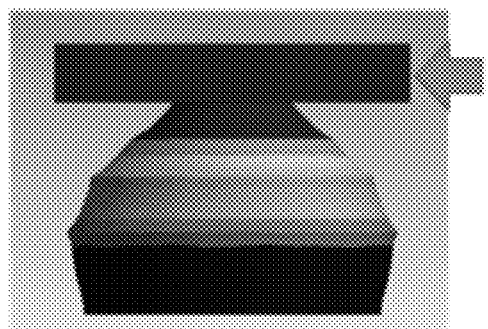
FIG. 21B is a side view of the corrugated diaphragm actuator of FIG. 21A, showing simulation data for expansion of the actuator and an impact force being applied perpendicular to the actuation direction of the actuator.
Figure 21C:
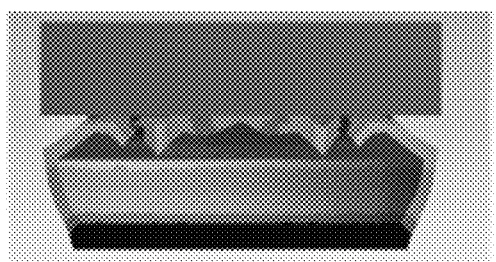
FIG. 21C is a cross-sectional side view of the corrugated diaphragm actuator of FIG. 21A, showing simulation data for deformation of the actuator after application of the impact force applied opposite the actuation direction of the actuator.
Figure 21D:
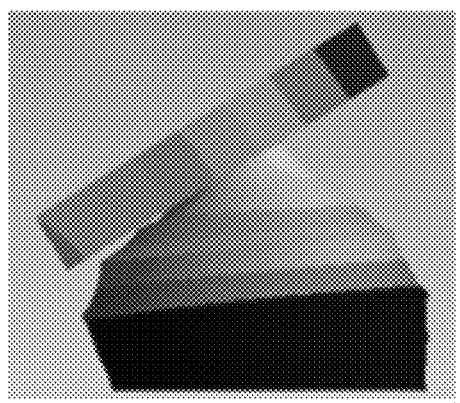
FIG. 21D is a cross-sectional side view of the corrugated diaphragm actuator of FIG. 21B, showing simulation data for deformation of the actuator after application of the impact force applied perpendicular to the actuation direction of the actuator.

Any of the aforementioned implementations of corrugated diaphragm actuators may be used to apply force and torque for lifting objects or bending joints by pressurizing the chamber cavity of the aforementioned corrugated diaphragm actuators. FIGS. 20A and 20B show a schematic of an implementation of a corrugated diaphragm actuator similar to the implementation shown in FIG. 1 applying force to an external object before and after becoming pressurized. The amount of pressure within the chamber cavity of the corrugated diaphragm actuator increases the amount of force the corrugated diaphragm actuator applies, as shown in the graph in FIG. 20C.

When applying external impact forces to aforementioned implementations of the corrugated diaphragm actuators, the shape of the pressurized corrugated diaphragm can be affected depending on the magnitude and orientation of the external force. FIGS. 21A-21D illustrate the deformation of the corrugated diaphragm (of an implementation similar to FIG. 1) due to normal and side-impact. The deformation and/or bending of the corrugated diaphragm, in some implementations, is used to attenuate linear, lateral, and rotational acceleration and normal or tangential force transfer due to an external impact or force.

In some applications, the aforementioned corrugated diaphragm actuators are used for force attenuation in protective gear, impact-absorbing liners, airdropping packages, or any other application that requires force attenuation. In some implementations, the aforementioned corrugated diaphragm actuators are used as a single actuator or a module in a multi-actuator assembly in a wide array of application scenarios.

Figure 22A:
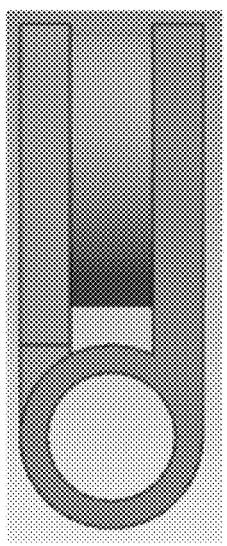
FIG. 22A is a side view of a robotic joint in accordance with implementations of the disclosure, with the robotic joint including a pair of pivotally connected segments and a corrugated diaphragm actuator, showing the robotic joint before applying pressure to a cavity of the actuator.
Figure 22B:
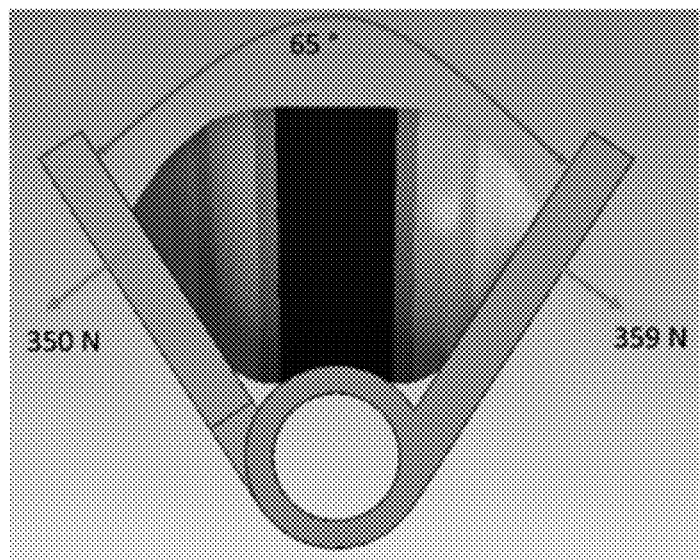
FIG. 22B is a side view of the robotic joint of FIG. 22A after applying pressure to the cavity.
Figure 23A:
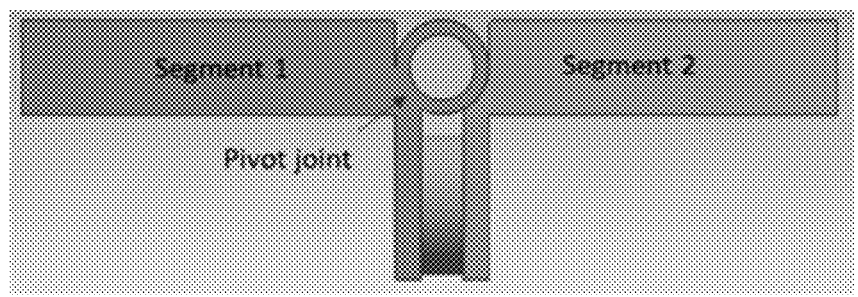
FIG. 23A is a side view of a robotic joint in accordance with implementations of the disclosure, with the robotic joint including a pair of pivotally connected segments and a corrugated diaphragm actuator, showing the robotic joint before applying pressure to a cavity of the actuator.
Figure 23B:
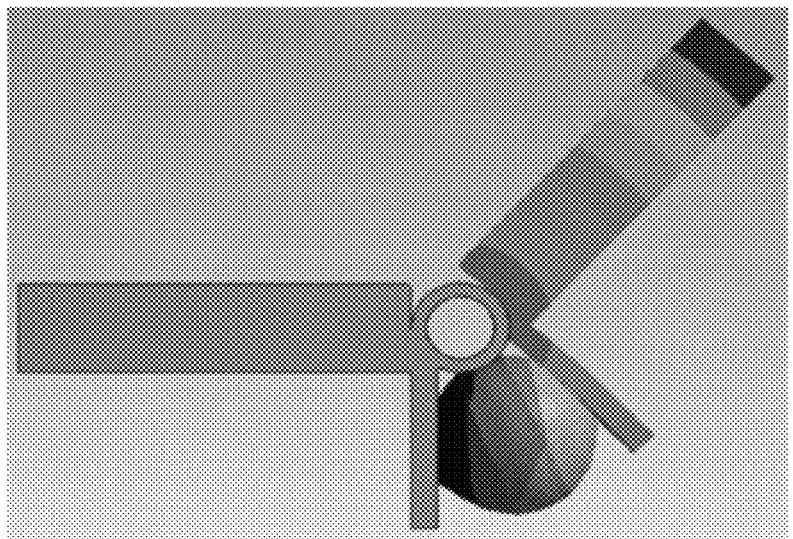
FIG. 23B is a side view of the robotic joint of FIG. 23A after applying pressure to the cavity.

In some applications, the actuators are used in the creation of robotics and exoskeleton joints; robotic end effectors; tilting, raising, and leveling platforms (beds, tables, etc.); impact-absorbing liners for reducing linear and rotational acceleration and force transfer (helmet, body amour, etc.). In one application as shown in FIGS. 22A-23B, the corrugated diaphragm actuator is integrated into a robotic joint. FIGS. 22A-22B show the actuator attached to a pivot joint that can apply angular motion and force, and FIGS. 23A-23B show the actuator attached to the robotic joint for moving robotic segments.

In other applications, multiple actuators are connected serially to make continuous bending soft actuators for robotic end-effector and exoskeleton applications. FIGS. 24A-24B show the bending behaviors when equally-sized actuators connected serially and apply equal pressure to the actuator. The bending behavior of these serially connected actuators can be controlled using actuators' geometrical features, the pressure applied to each actuator; as well as combining different sized actuators. FIG. 24C shows the simulation data when the first two actuators have higher inflation pressure, while FIG. 24D shows the behavior of the bending of the actuators when two larger actuators are used in the middle.

Figure 25A:
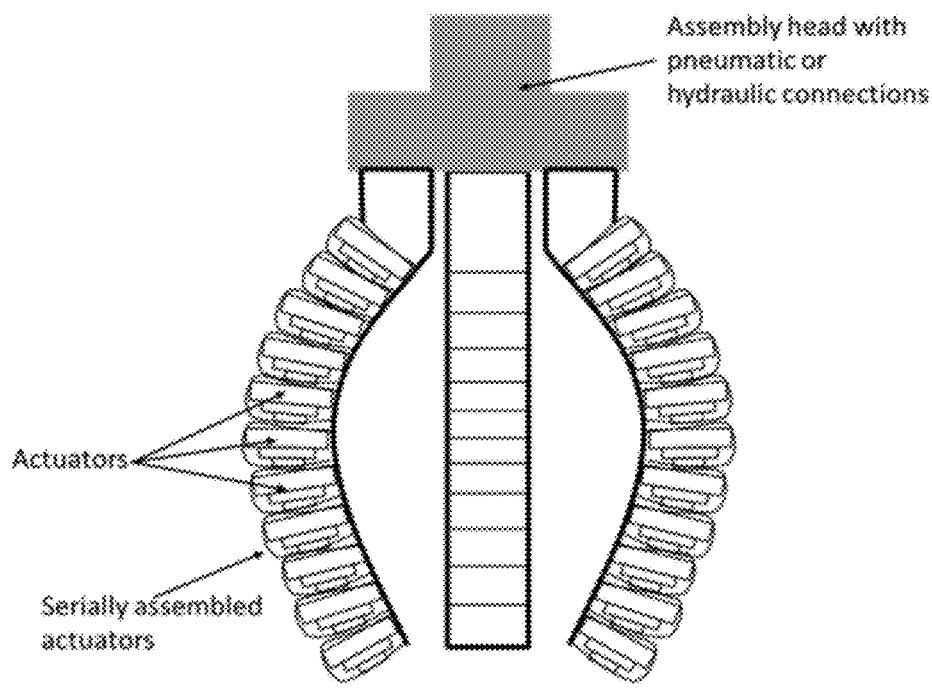
FIG. 25A is a side view of an end-effector including a plurality of arrays of corrugated diaphragm actuators in series in accordance with implementations of the disclosure, showing the end-effector after applying pressure to cavities of the actuators.
Figure 25B:
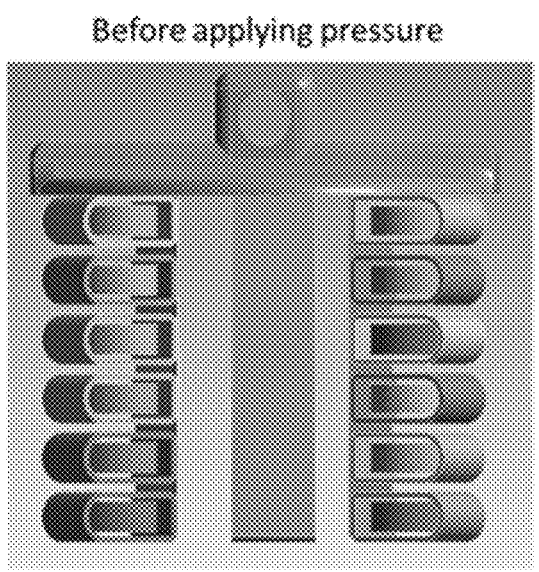
FIG. 25B is a side view of the end-effector of FIG. 25A, showing simulation data before applying pressure to the cavities.
Figure 25C:
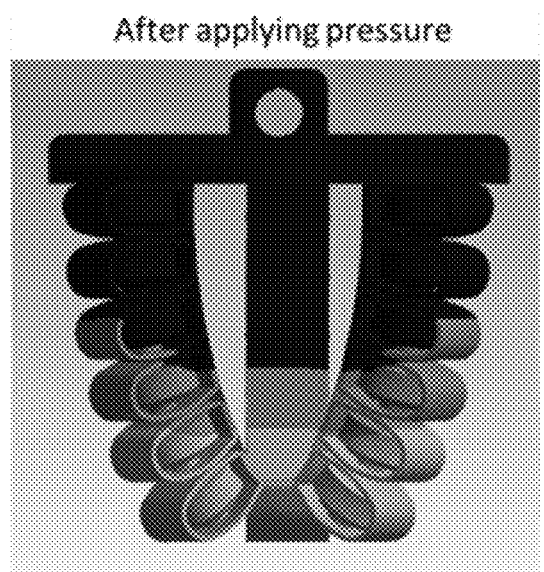
FIG. 25C is a side view of the end-effector of FIG. 25A, showing simulation data after applying pressure to the cavities.

Another application of the corrugated diaphragm actuators is an end-effector with multiple fingers, such as two, three, or more fingers using serially connected actuators. An example end-effector with three fingers is shown in FIG. 25A. Simulations of the end effector are shown in FIGS. 25B-25C.

Figure 26A:
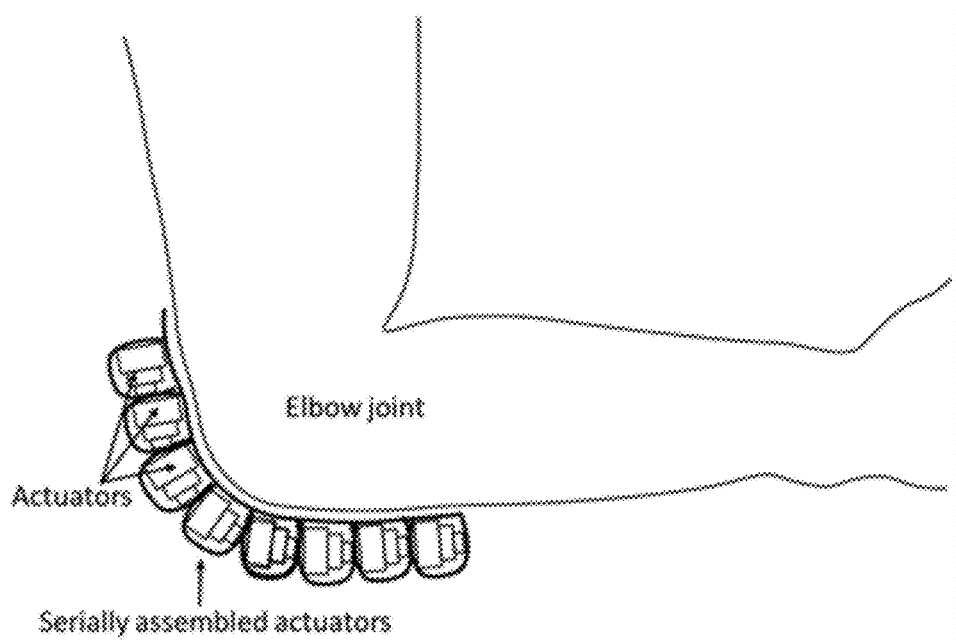
FIG. 26A is a side view of an exoskeleton joint including an array of corrugated diaphragm actuators in series in accordance with implementations of the disclosure, showing the exoskeleton joint after applying pressure to cavities of the actuators.
Figure 26B:
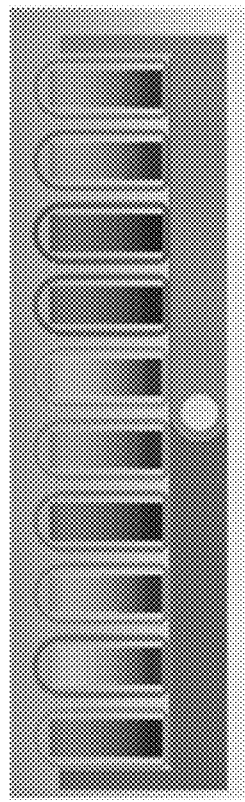
FIG. 26B is a side view of the exoskeleton joint of FIG. 26A, showing simulation data before applying pressure to the cavities.
Figure 26C:
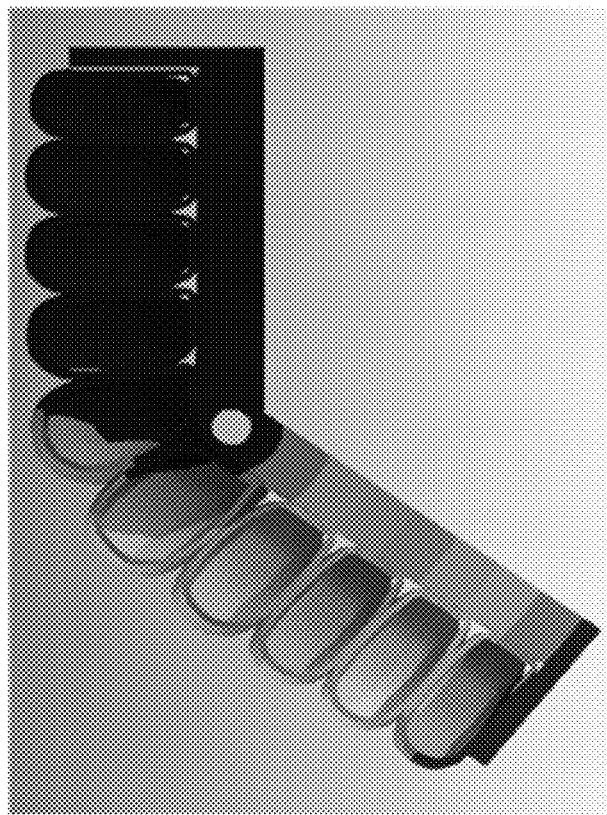
FIG. 26C is a side view of the exoskeleton joint of FIG. 26A, showing simulation data after applying pressure to the cavities.
Figure 27A:
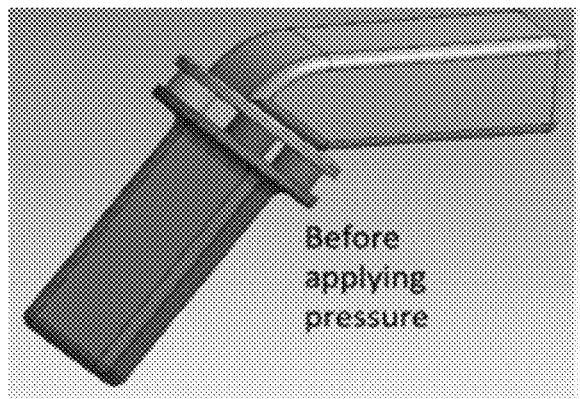
FIG. 27A is a perspective view of a multi-degree-of-freedom joint including an array of corrugated diaphragm actuators in parallel in accordance with implementations of the disclosure, showing the multi-degree-of-freedom joint before applying pressure to cavities of the actuators.
Figure 27B:
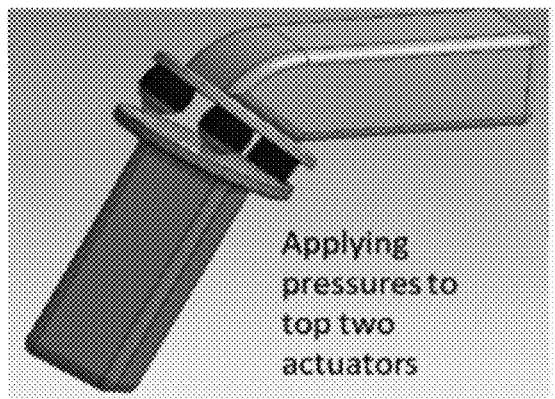
FIG. 27B is a perspective view of the multi-degree-of-freedom joint of FIG. 27A, showing simulation data after applying pressure to the cavities of the two top actuators.
Figure 27C:
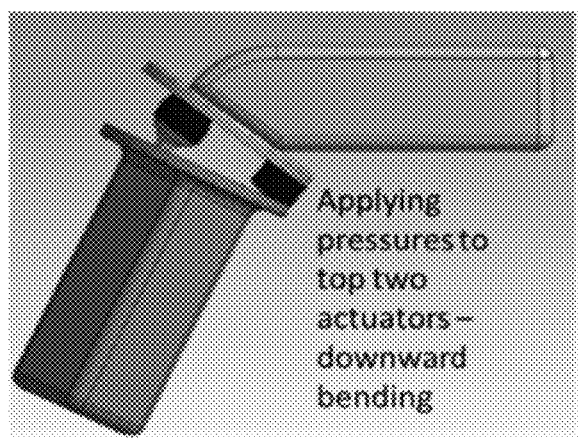
FIG. 27C is a side view of the multi-degree-of-freedom joint of FIG. 27A, showing simulation data after applying pressure to the cavities of the two top actuators.
Figure 27D:
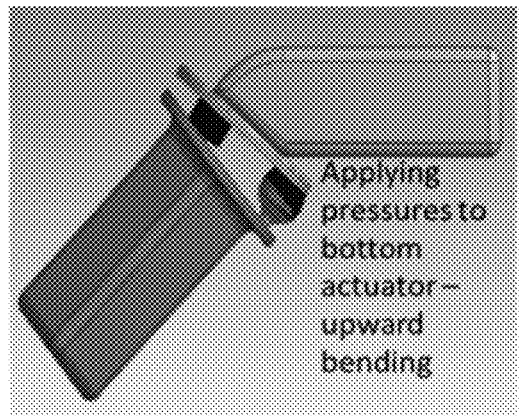
FIG. 27D is a side view of the multi-degree-of-freedom joint of FIG. 27A, showing simulation data after applying pressure to the cavity of the bottom actuator.
Figure 28A:
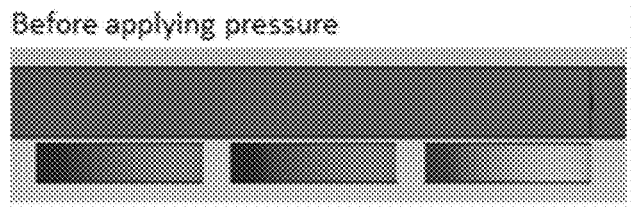
FIG. 28A is a side view of an array of corrugated diaphragm actuators in parallel in accordance with implementations of the disclosure, showing a platform positioned on the array before applying pressure to cavities of the actuators.
Figure 28B:
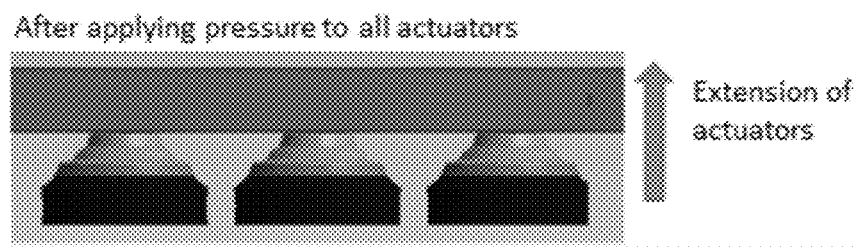
FIG. 28B is a side view of the array and platform of FIG. 28A, showing simulation data after applying pressure to the cavities of the actuators for raising the platform.
Figure 28C:
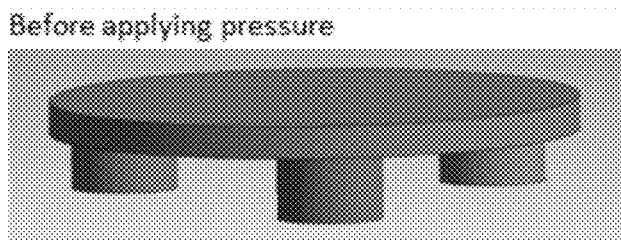
FIG. 28C is a perspective view of the array and platform of FIG. 28A before applying pressure to cavities of the actuators.
Figure 28D:
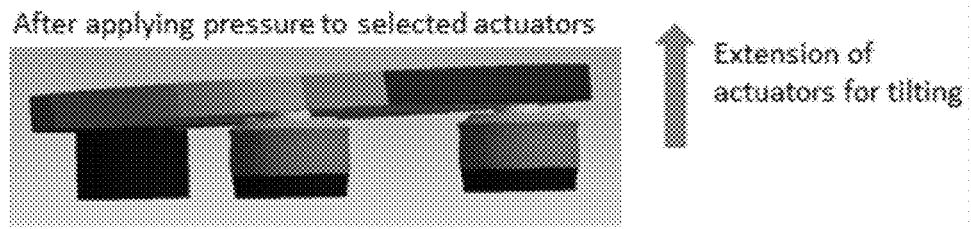
FIG. 28D is a perspective view of the array and platform of FIG. 28A, showing simulation data after applying pressure to the cavities of two of the actuators for tilting the platform.

In another application, a serially connected actuator array is configured to form an exoskeleton joint, as shown in FIGS. 26A-26C. FIG. 26A shows an example of an actuator array that can be used for the human elbow joint, while FIGS. 26B-26C show numerical simulation results of an actuator array on one DOF joint similar to the elbow or knee.

In yet another application, multi degree of freedom joints are made using multiple actuators in parallel along with variable actuation pressure at each actuator for robotics and exoskeletons applications. FIGS. 27A-27D show one such a joint created with three parallel actuators.

In another application, when a set of actuators assembled in parallel on a platform, the actuators can be pressurized to achieve extension for raising, leveling, or tilting. FIGS. 28A-28D graphically show such applications. Pressurizing all the actuators to a same pressure can raise and level a platform. In the tilting case, selected actuators can be pressurized for achieving desired tilting angle. Closed loop control with sensors such as accelerometers and gyroscope can be implemented for achieving exact tilting angle or levelling.

Figure 29:
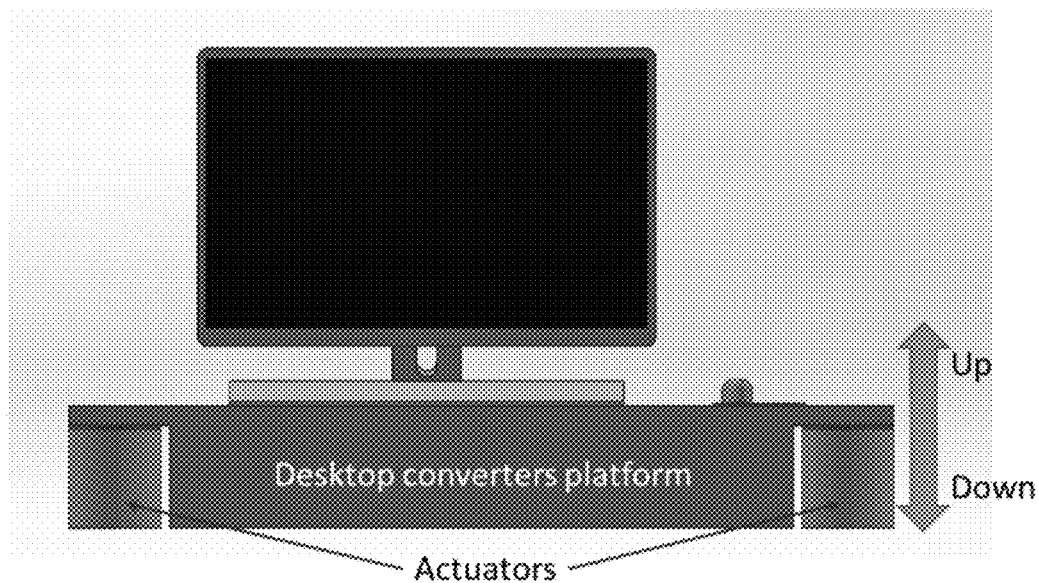
FIG. 29 is a front view of a desktop converters platform having a pair of corrugated diaphragm actuators in parallel for raising and lowering the platform in accordance with implementations of the disclosure.
Figure 30A:
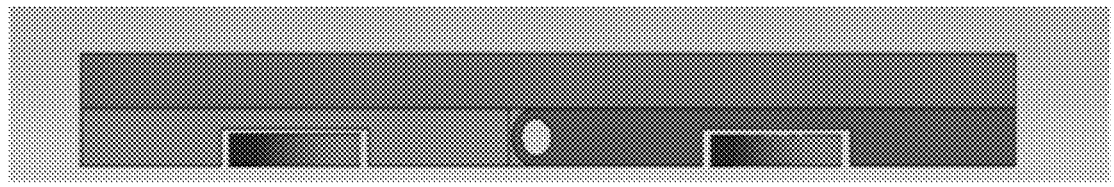
FIG. 30A is a side view of a mattress assembly having a pair of corrugated diaphragm actuators in parallel for tilting, raising, and lowering a mattress in accordance with implementations of the disclosure.
Figure 30B:
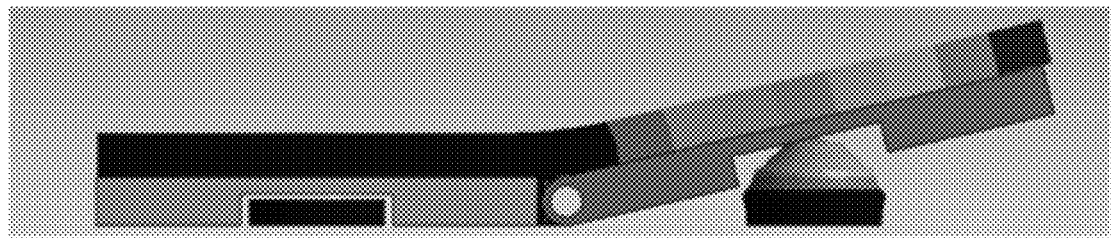
FIG. 30B is a side view of the mattress assembly of FIG. 30A, showing simulation data after applying pressure to a cavity of one of the actuators for tilting the mattress.

Other applications enabled by the assembly of these actuators in parallel include adjustable-height desktop converters, as shown in FIG. 29, and tilting mattresses, as shown in FIGS. 30A-30B.

In yet another application and as shown in FIGS. 31A-31E, the corrugated diaphragm actuators are made into a helmet for head impact absorption. A helmet liner made with the aforementioned actuators can provide three critical functions to wear: (1) actuators can be pressurized to improve fit, (2) attenuate force transfer to the head and linear acceleration transfer, and (3) reduce rotational acceleration of head due to an impact. FIG. 31A shows a schematic representation of a helmet liner. FIGS. 31B-31E show the simulation data on: (1) Expansion of actuator can be used to the conformal fitting of the helmet to the head; (2) Actuator collapsing to absorb impact, however, will come back to original shape due to hyperplastic properties of the constructed material and pressure inside the actuator. (3) Collapsing and lateral movement of the helmet against the head, which reduces the rotational acceleration. In other applications and implementations, the actuators are also be applied to other impact reduction in body armor applications.

Figure 32A:
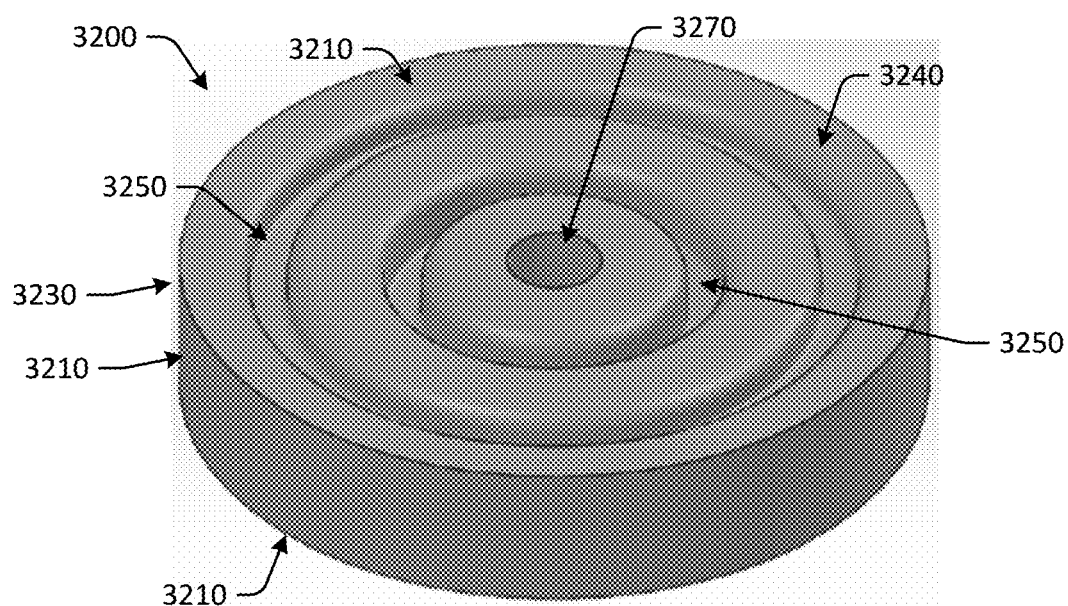
FIG. 32A is a perspective view of a corrugated diaphragm actuator in accordance with implementations of the disclosure.
Figure 32B:
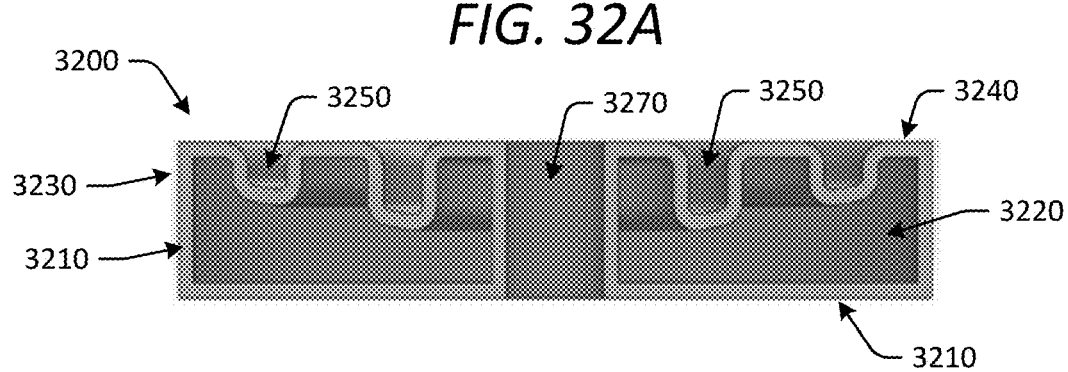
FIG. 32B is a cross-sectional side view of the corrugated diaphragm actuator of FIG. 32A.
Figure 32C:
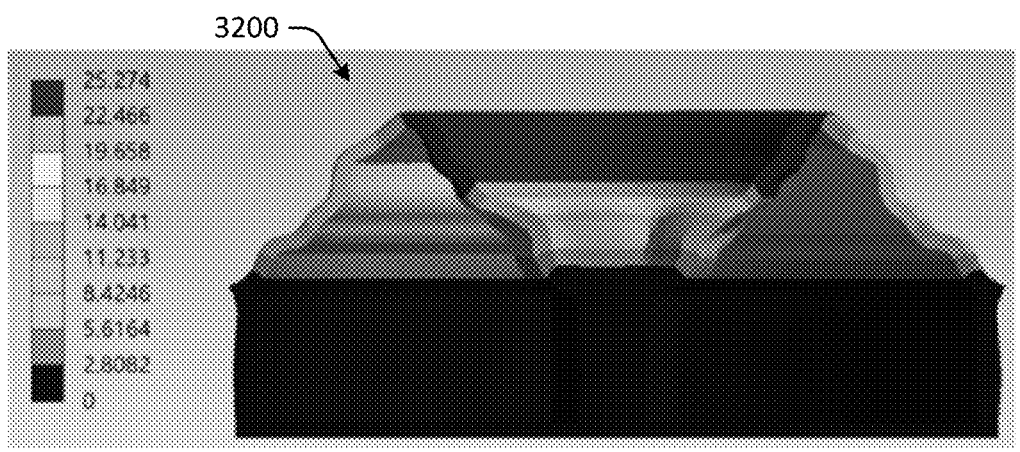
FIG. 32C is a cross-sectional side view of the corrugated diaphragm actuator of FIG. 32A, showing simulation data for expansion of the actuator.

FIGS. 32A-32B show a corrugated diaphragm actuator 3200 that includes three connected walls 3210. The walls 3210 define a chamber cavity 3220 and form a cylindrical chamber body 3230. One of the walls 3210 includes a corrugated diaphragm 3240. The corrugated diaphragm 3240 defines two corrugated channels 3250 arranged in a concentric manner and centered on the wall 3210. As shown, the corrugated channels 3250 have different depths. The path of each of the corrugated channels 3250 corresponds to the shape of the wall 3210 that includes the corrugated diaphragm 3240. When pressure is applied through a fluid inlet into the chamber cavity 3220, the corrugated diaphragm 3240 outwardly expands and provides both displacement and force. As shown, the corrugated diaphragm actuator 3200 defines a thru opening 3270 extending through a center of the actuator 3200 from one of the walls 3210 to an opposite wall 3210. In this manner, the corrugated diaphragm actuator 3200 has a donut shaped configuration, and the thru opening 3270 may be used to facilitate mounting of the actuator 3200 to other structures. FIG. 32C shows simulation data for expansion of the corrugated diaphragm actuator 3200.

Figure 32D:
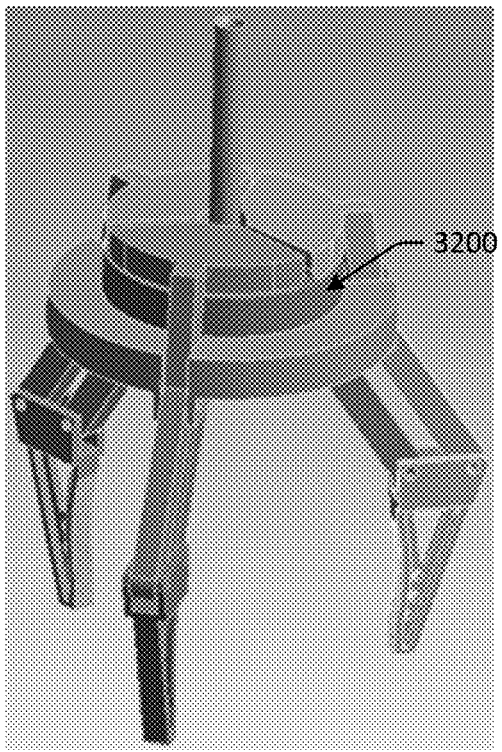
FIG. 32D is a perspective view of an end-effector including three fingers and one of the corrugated diaphragm actuators of FIG. 32A before applying pressure within a cavity of the actuator (simulation).
Figure 32E:
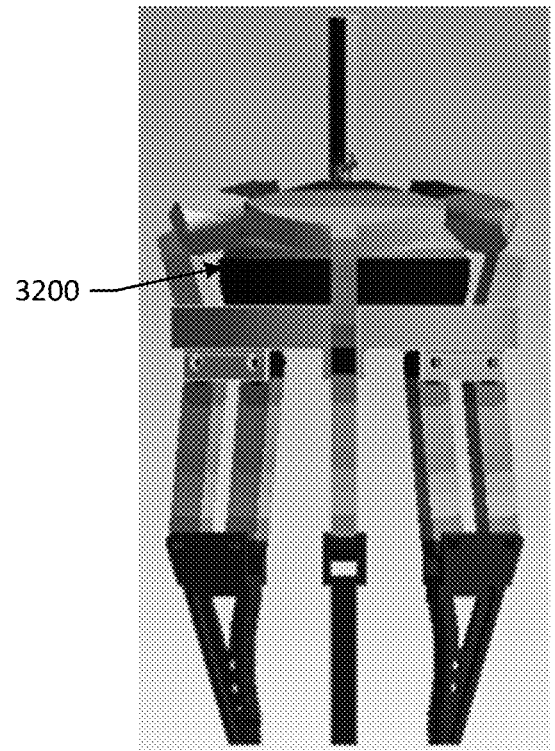
FIG. 32E is a side view of the end-effector of FIG. 32D after applying pressure within the cavity of the actuator for closing the end-effector (simulation).
Figure 32F:
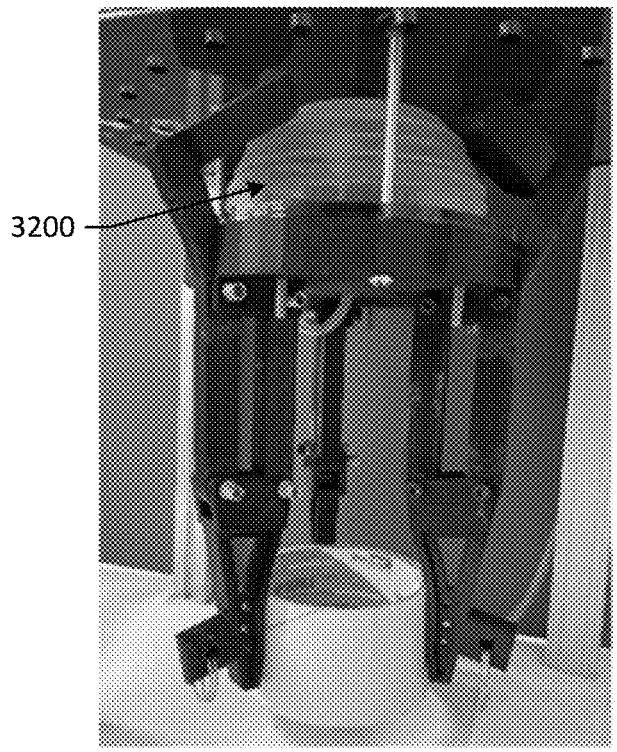
FIG. 32F is a perspective view of the end-effector of FIG. 32D after applying pressure within the cavity of the actuator for closing the end-effector to grasp an object.

FIGS. 32D-32F illustrate an example application of the corrugated diaphragm actuator 3200 as part of a robotic end-effector. As shown, the end-effector is formed as a gripper including three fingers and one of the corrugated diaphragm actuators 3200. Actuation of the corrugated diaphragm actuator 3200 may cause the end-effector to move from an open configuration, as shown in FIG. 32D, to a closed configuration, as shown in FIGS. 32E-32F, for grasping an object. In particular, upon applying pressure within the chamber cavity 3220, the corrugated diaphragm 3240 may expand and apply force to adjacent components of the end-effector, which in turn may cause the fingers to move radially inward for grasping an object. Conversely, upon decreasing pressure within the chamber cavity 3220, the corrugated diaphragm 3240 may contract, causing the end-effector to return to the open configuration, for example, to release a grasped object.

FIGS. 33A-33B show a corrugated diaphragm actuator 3300 that includes six connected walls 3310. The walls 3310 define a chamber cavity 3320 and form a rectangular chamber body 3330. One of the walls 3310 includes a corrugated diaphragm 3340. The corrugated diaphragm 3340 defines a corrugated channel 3350 that is centered on the wall 3310. As shown, the corrugated channel 3350 is rectangular. The path of the corrugated channel 3350 corresponds to the shape of the wall 3310 that includes the corrugated diaphragm 3340. When pressure is applied through a fluid inlet into the chamber cavity 3320, the corrugated diaphragm 3340 outwardly expands and provides both displacement and force. As shown, the wall 3310 opposite the wall 3310 that includes the corrugated diaphragm 3340 may be curved to facilitate mounting of the actuator 3300 to other structures. FIG. 33C shows simulation data for expansion of the corrugated diaphragm actuator 3300.

Figure 33D:
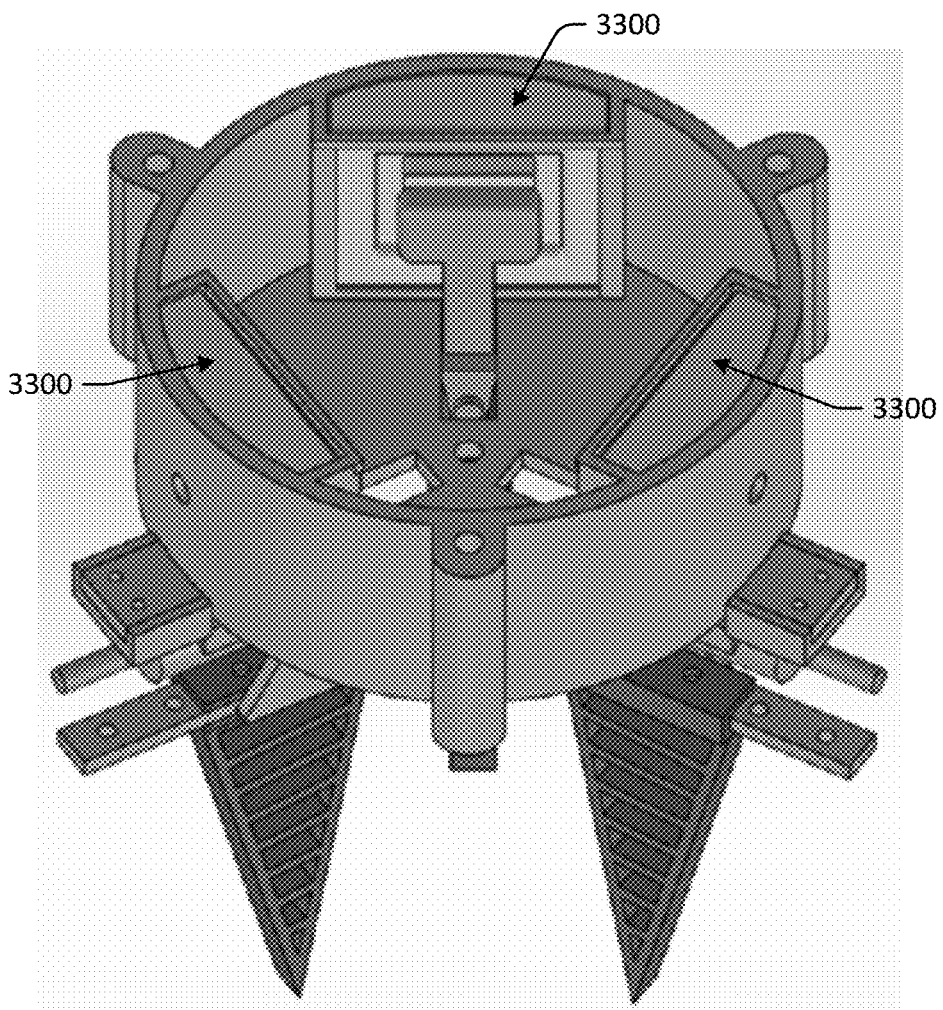
FIG. 33D is a perspective view of an end-effector including three fingers and three of the corrugated diaphragm actuators of FIG. 33A before applying pressure within cavities of the actuators.
Figure 33E:
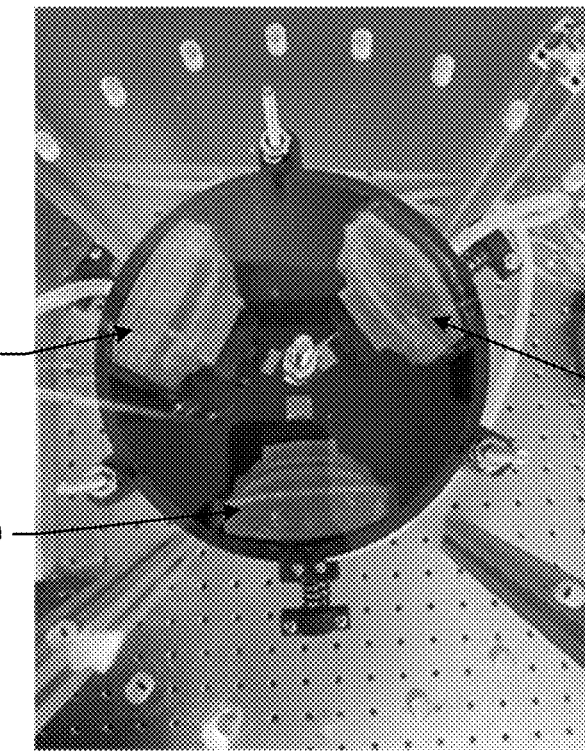
FIG. 33E is a top view of the end-effector of FIG. 33D after applying pressure within the cavities of the actuators for closing the end-effector.
Figure 33F:
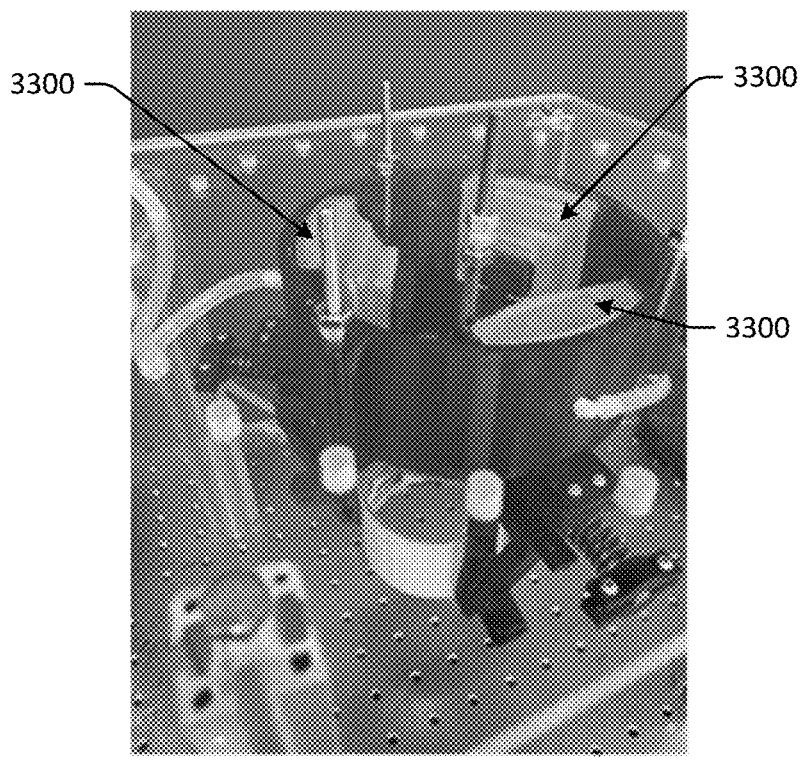
FIG. 33F is a perspective view of the end-effector of FIG. 33D after applying pressure within the cavities of the actuators for closing the end-effector to grasp an object.

FIGS. 33D-33F illustrate an example application of the corrugated diaphragm actuator 3300 as part of a robotic end-effector. As shown, the end-effector is formed as a gripper including three fingers and three of the corrugated diaphragm actuators 3300. Actuation of the corrugated diaphragm actuators 3300 may cause the end-effector to move from an open configuration, as shown in FIG. 33D, to a closed configuration, as shown in FIGS. 33E-33F, for grasping an object. In particular, upon applying pressure within the chamber cavities 3320, the corrugated diaphragms 3340 may expand and apply force to adjacent components of the end-effector, which in turn may cause the fingers to move radially inward for grasping an object. Conversely, upon decreasing pressure within the chamber cavities 3320, the corrugated diaphragms 3340 may contract, causing the end-effector to return to the open configuration, for example, to release a grasped object.

Figures 34A, 34B:
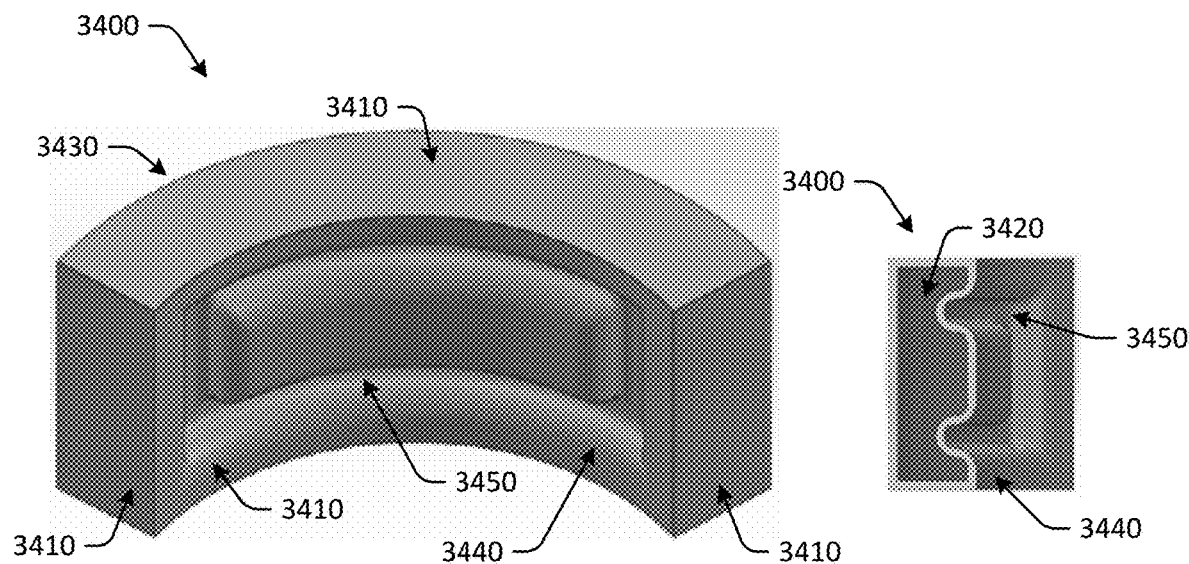
FIG. 34A is a perspective view of a corrugated diaphragm actuator in accordance with implementations of the disclosure.
FIG. 34B is a cross-sectional side view of the corrugated diaphragm actuator of FIG. 34A.
Figure 34C:
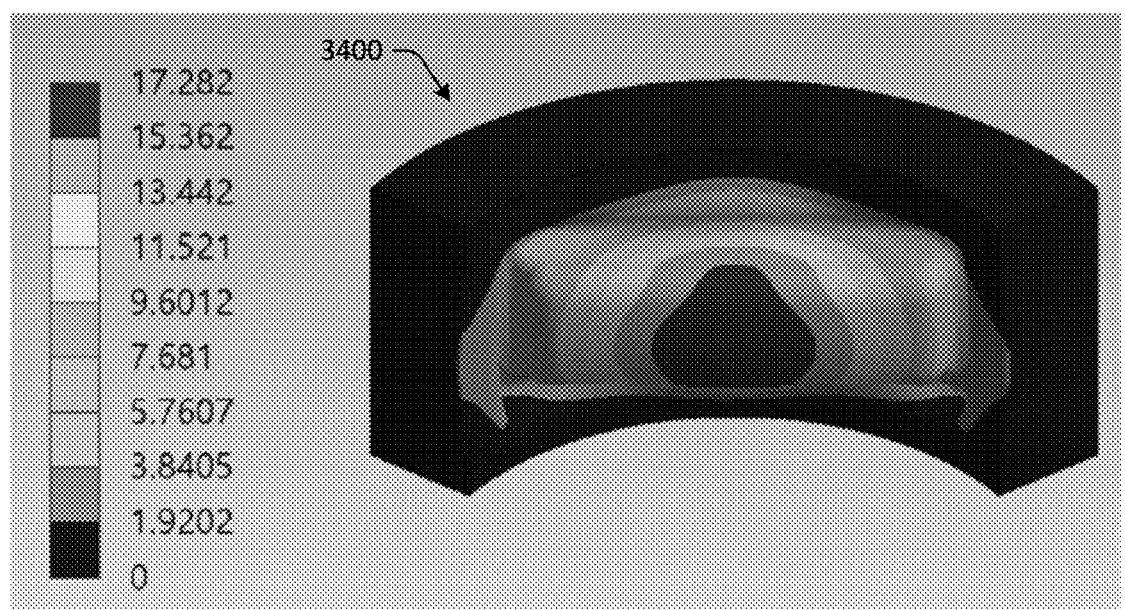
FIG. 34C is a perspective view of the corrugated diaphragm actuator of FIG. 34A, showing simulation data for expansion of the actuator.

FIGS. 34A-34B show a corrugated diaphragm actuator 3400 that includes six connected walls 3410. The walls 3410 define a chamber cavity 3420 and form a curved chamber body 3430. One of the walls 3410 includes a corrugated diaphragm 3440. The corrugated diaphragm 3440 defines a corrugated channel 3450 that is centered on the wall 3410. As shown, the corrugated channel 3450 is curved. The path of the corrugated channel 3450 corresponds to the shape of the wall 3410 that includes the corrugated diaphragm 3440. When pressure is applied through a fluid inlet into the chamber cavity 3420, the corrugated diaphragm 3440 outwardly expands and provides both displacement and force. As shown, the wall 3410 that includes the corrugated diaphragm 3440 may have a concave profile, and the wall 3410 opposite the wall 3410 that includes the corrugated diaphragm 3440 may have a convex profile. FIG. 34C shows simulation data for expansion of the corrugated diaphragm actuator 3400.

Figure 34D:
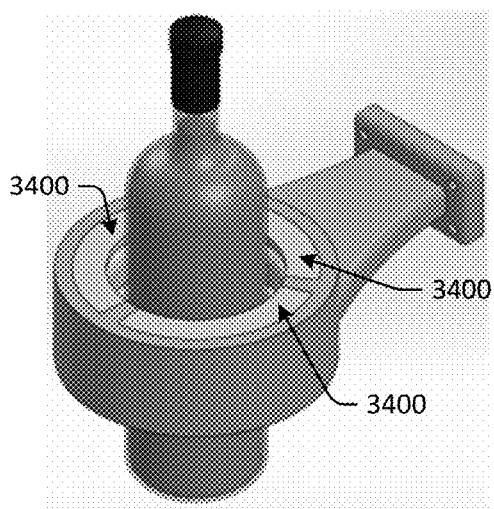
FIG. 34D is a perspective view of an end-effector including a ring-shaped support and three of the corrugated diaphragm actuators of FIG. 34A before applying pressure within cavities of the actuators, showing the end-effector positioned around a bottle.
Figure 34E:
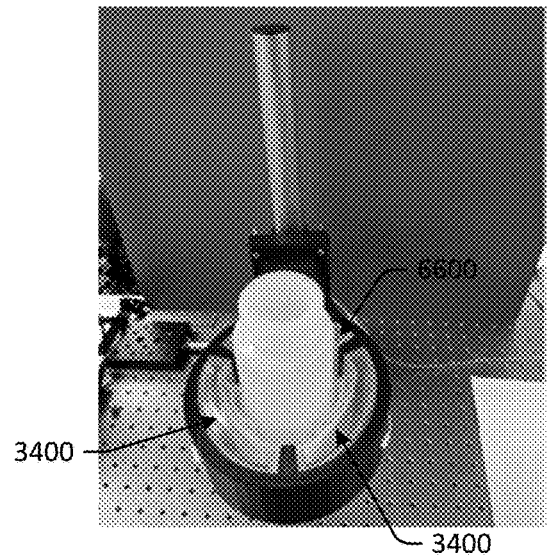
FIG. 34E is a perspective view of the end-effector of FIG. 34D after applying pressure within the cavities of the actuators for grasping a bottle.

FIGS. 34D-34E illustrate an example application of the corrugated diaphragm actuator 3400 as part of a robotic end-effector. As shown, the end-effector is formed as a gripper including a ring-shaped support and three of the corrugated diaphragm actuators 3400 mounted within the ring-shaped support. Actuation of the corrugated diaphragm actuators 3400 may cause the end-effector to move from an open configuration, as shown in FIG. 34D, to a closed configuration, as shown in FIG. 34E, for grasping an object positioned within the ring-shaped support. In particular, upon applying pressure within the chamber cavities 3420, the corrugated diaphragms 3440 may expand inward and apply force to an object within the end-effector, thereby reducing the size of the opening through the end-effector and grasping the object. Conversely, upon decreasing pressure within the chamber cavities 3420, the corrugated diaphragms 3440 may contract, causing the end-effector to return to the open configuration, for example, to release a grasped object.

Figure 34F:
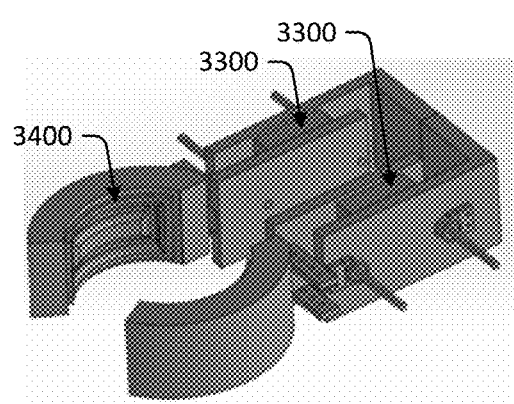
FIG. 34F is a perspective view of an end-effector including two curved supports and two of the corrugated diaphragm actuators of FIG. 34A before applying pressure within cavities of the actuators.
Figure 34G:
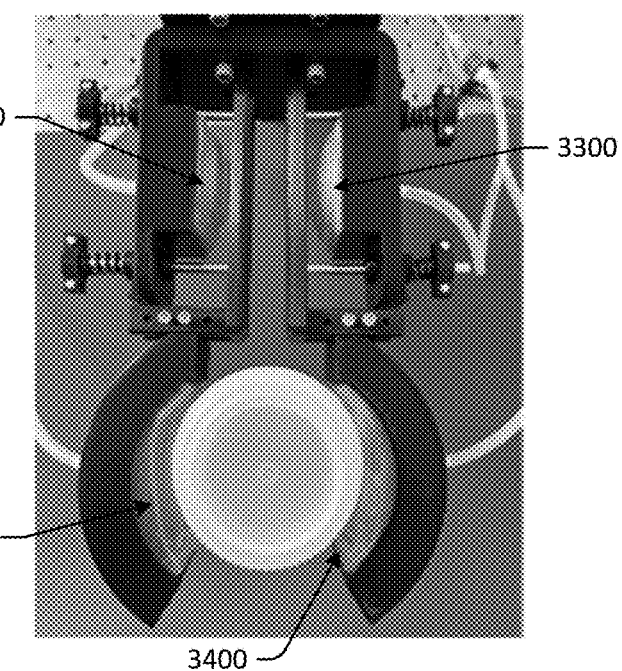
FIG. 34G is a top view of the end-effector of FIG. 34F after applying pressure within the cavities of the actuators for grasping a bottle.

FIGS. 34F-34G illustrate another example application of the corrugated diaphragm actuator 3400 and the corrugated diaphragm actuator 3300 as part of a robotic end-effector. As shown, the end-effector is formed as a gripper including two curved supports, two of the corrugated diaphragm actuators 3400 each mounted to one of the curved supports, and two of the corrugated diaphragm actuators 3300. Actuation of the corrugated diaphragm actuators 3300 may cause the end-effector to move from an open configuration, as shown in FIG. 34F, to a closed configuration, as shown in FIG. 34G, for grasping an object positioned between the curved supports. Upon applying pressure within the chamber cavities 3420, the corrugated diaphragms 3440 may expand inward and apply force to an object between the curved supports, thereby reducing the size of the gap through the end-effector and grasping the object. Conversely, upon decreasing pressure within the chamber cavities 3420 and the chamber cavities 3320, the corrugated diaphragms 3440, 3340 may contract, causing the end-effector to return to the open configuration, for example, to release a grasped object.

FIGS. 35A-35B show a corrugated diaphragm actuator 3500 that includes three connected walls 3510. The walls 3510 define a chamber cavity 3520 and form a cylindrical chamber body 3530. One of the walls 3510 includes a corrugated diaphragm 3540. As shown, the side wall 3510 includes the corrugated diaphragm 3540. The corrugated diaphragm 3540 defines two corrugated channels 3550 that are spaced apart from one another and each extend along a circumference of the chamber body 3530. As shown, the corrugated channels 3550 are curved. The path of each of the corrugated channels 3550 corresponds to the shape of the wall 3510 that includes the corrugated diaphragm 3540. When pressure is applied through a fluid inlet into the chamber cavity 3520, the corrugated diaphragm 3540 outwardly expands and provides both displacement and force. As shown, the corrugated diaphragm actuator 3500 defines a thru opening 3570 extending through a center of the actuator 3500 from one of the walls 3510 to an opposite wall 3510. In this manner, the corrugated diaphragm actuator 3500 has a donut shaped configuration, and the thru opening 3570 may be used to facilitate mounting of the actuator 3500 to other structures. FIG. 35C shows simulation data for expansion of the corrugated diaphragm actuator 3500.

Figure 35D:
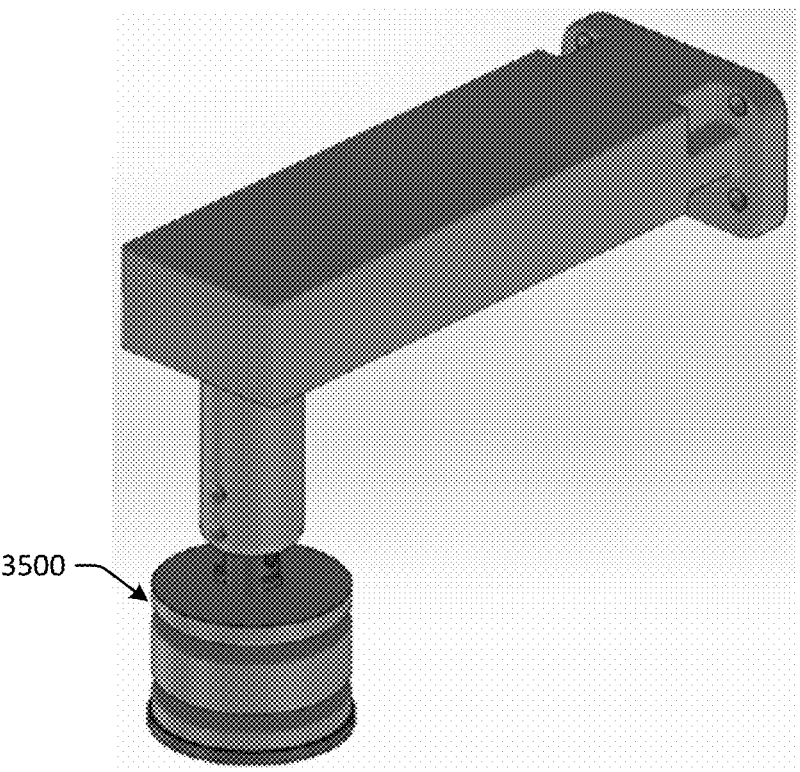
FIG. 35D is a perspective view of an end-effector including a central post and one of the corrugated diaphragm actuators of FIG. 35A before applying pressure within a cavity of the actuator.
Figure 35E:
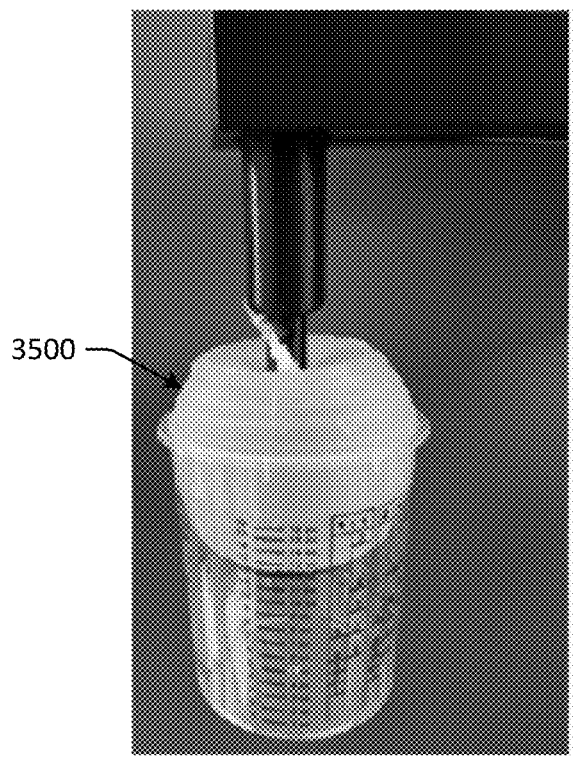
FIG. 35E is a perspective view of the end-effector of FIG. 35D after applying pressure within the cavity of the actuator for securing a container.

FIGS. 35D-35E illustrate an example application of the corrugated diaphragm actuator 3500 as part of a robotic end-effector. As shown, the end-effector is formed as a gripper including a central post and one of the corrugated diaphragm actuators 3500 mounted around the central post. Actuation of the corrugated diaphragm actuator 3500 may cause the end-effector to move from a collapsed configuration, as shown in FIG. 35D, to an expanded configuration, as shown in FIG. 35E, for grasping an object, such as a container, via an opening of the object. In particular, upon positioning the corrugated diaphragm actuator 3500 at least partially within an opening of an object and applying pressure within the chamber cavity 3520, the corrugated diaphragm 3540 may expand radially outward and apply force to a wall of the object defining the opening, thereby securing the actuator 3500 within the opening and grasping the object. Conversely, upon decreasing pressure within the chamber cavity 3520, the corrugated diaphragm 3540 may contract, causing the end-effector to return to the collapsed configuration, for example, to release a grasped object.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," and "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A corrugated diaphragm actuator comprising:
a chamber body comprising a plurality of walls defining a cavity,
wherein the plurality of walls comprises a first wall comprising a first corrugated diaphragm defining at least one first corrugated channel extending circumferentially about a central longitudinal axis of the corrugated diaphragm actuator, and wherein the first corrugated diaphragm is configured for expanding outwardly when a positive pressure is applied within the cavity, wherein the at least one first corrugated channel has a depth measured in a direction parallel to the central longitudinal axis that varies along of the at least one first corrugated channel.

2. The corrugated diaphragm actuator of claim 1, wherein the chamber body has a cylindrical shape.

3. The corrugated diaphragm actuator of claim 2, wherein the first wall is a top wall or a bottom wall of the chamber body.

4. The corrugated diaphragm actuator of claim 1, wherein the at least one first corrugated channel is centered on the first wall.

5. The corrugated diaphragm actuator of claim 1, wherein a path of the at least one first corrugated channel has a circular shape, an ovoid shape, or a polygonal shape.

6. The corrugated diaphragm actuator of claim 1, wherein a cross-sectional shape of the at least one first corrugated channel is a rectangular shape, a V shape, a curved shape, or a parabolic shape.

7. The corrugated diaphragm actuator of claim 1, wherein the first wall has a planar profile.

8. The corrugated diaphragm actuator of claim 1, wherein the first wall has a circular shape, an ovoid shape, or a polygonal shape.

9. The corrugated diaphragm actuator of claim 1, wherein a shape of a path of the at least one first corrugated channel corresponds to a shape of the first wall.

10. The corrugated diaphragm actuator of claim 1, further comprising a second wall opposite and spaced apart from the first wall along the central longitudinal axis when the first corrugated diaphragm is in an unexpanded state, the second wall being substantially perpendicular to the central longitudinal axis.

11. The corrugated diaphragm actuator of claim 1, wherein the chamber body comprises a flexible component comprising at least the first wall and a rigid component comprising at least one additional wall of the plurality of walls.

12. The corrugated diaphragm actuator of claim 1, wherein the first corrugated diaphragm is configured for expanding outwardly and bending at an angle greater than 0° when the positive pressure is applied within the cavity.

13. The corrugated diaphragm actuator of claim 1, wherein the at least one first corrugated channel has a channel angle greater than 0° and less than 90° as measured between a plane passing through a bottom surface of the at least one first corrugated channel and a plane that is perpendicular to the central longitudinal axis.

* * * * *

UNITED STATES PATENT AND TRADEMARK OFFICE
CERTIFICATE OF CORRECTION

| | | |
|---|---|---|
| PATENT NO. | : 12,286,983 B2 | Page 1 of 1 |
| APPLICATION NO. | : 17/700385 | |
| DATED | : April 29, 2025 | |
| INVENTOR(S) | : Muthu Wijesundara et al. | |

It is certified that error appears in the above-identified patent and that said Letters Patent is hereby corrected as shown below:

In the Specification

In Column 13, Line 27, "…amour…" should read -- armor --

In the Claims

In Column 18, Line 8, Claim 1, "…along of the at least…" should read -- along the at least --

Signed and Sealed this
Sixteenth Day of September, 2025

Coke Morgan Stewart
*Acting Director of the United States Patent and Trademark Office*